United States Patent
Wu et al.

(10) Patent No.: US 8,989,139 B2
(45) Date of Patent: Mar. 24, 2015

(54) GENERIC ACCESS NETWORK AND METHOD FOR IMPLEMENTING SERVICES BY USING GENERIC ACCESS NETWORK

(75) Inventors: Xiaobo Wu, Shenzhen (CN); Xiaoqin Duan, Shenzhen (CN); Jian Zhang, Shenzhen (CN); Yang Zhao, Shenzhen (CN); Qingyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 12/707,167

(22) Filed: Feb. 17, 2010

(65) Prior Publication Data
US 2010/0142483 A1 Jun. 10, 2010

Related U.S. Application Data

(63) Continuation of application No. PCT/CN2008/072064, filed on Aug. 20, 2008.

(30) Foreign Application Priority Data

Aug. 21, 2007 (CN) .......................... 2007 1 0145281
Nov. 1, 2007 (CN) .......................... 2007 1 0168085

(51) Int. Cl.
*H04W 4/00* (2009.01)
*H04W 88/16* (2009.01)
(Continued)

(52) U.S. Cl.
CPC .............. *H04W 88/16* (2013.01); *H04M 15/00* (2013.01); *H04M 15/62* (2013.01); *H04M 15/66* (2013.01); *H04W 4/24* (2013.01); *H04L 12/14* (2013.01); *H04M 2215/204* (2013.01); *H04W 36/0022* (2013.01); *H04W 76/026* (2013.01);
(Continued)

(58) Field of Classification Search
USPC .......................................................... 370/331
See application file for complete search history.

(56) References Cited

U.S. PATENT DOCUMENTS

2006/0092925 A1  5/2006  Svensson et al.
2006/0114871 A1  6/2006  Buckley et al.
(Continued)

FOREIGN PATENT DOCUMENTS

| CN | 1568049 A | 1/2005 |
| CN | 101242643 A | 8/2008 |
| EP | 1 804 435 A1 | 7/2007 |
| WO | WO 2006/095264 A1 | 9/2006 |

OTHER PUBLICATIONS

Extended European Search Report dated (mailed) Feb. 2, 2011, issued in related Application No. 08784055.9-1249/2192834, PCT/CN2008072064, Hauwei Technologies Co., Ltd.
(Continued)

*Primary Examiner* — Derrick Ferris
*Assistant Examiner* — Kodzovi Acolatse
(74) *Attorney, Agent, or Firm* — Huawei Technologies Co., Ltd.

(57) ABSTRACT

A Generic Access Network (GAN) and a method for implementing services by using the GAN are disclosed. The GAN is configured to connect a generic IP network with a target network, and includes a Generic Access Network Controller (GANC) configured to enable a User Equipment (UE) to access the target network via the generic IP network. The GANC includes: a user interface, configured to connect the UE; and a Policy and Charging Control (PCC) interface, configured to trigger a process of establishing bearers of the generic IP network.

12 Claims, 19 Drawing Sheets

(51) Int. Cl.
*H04M 15/00* (2006.01)
*H04W 4/24* (2009.01)
*H04L 12/14* (2006.01)
*H04W 36/00* (2009.01)
*H04W 76/02* (2009.01)
*H04W 88/06* (2009.01)
*H04W 92/02* (2009.01)
*H04W 92/06* (2009.01)

(52) U.S. Cl.
CPC .............. *H04W 88/06* (2013.01); *H04W 92/02* (2013.01); *H04W 92/06* (2013.01)
USPC ........................... 370/331; 370/328; 370/338

(56) References Cited

U.S. PATENT DOCUMENTS

| | | | |
|---|---|---|---|
| 2007/0177585 | A1 | 8/2007 | El Mghazli et al. |
| 2007/0287459 | A1* | 12/2007 | Diachina et al. ............... 455/436 |
| 2008/0002637 | A1* | 1/2008 | Oswal et al. ................... 370/338 |
| 2008/0039087 | A1* | 2/2008 | Gallagher et al. ......... 455/435.2 |
| 2009/0036131 | A1* | 2/2009 | Diachina et al. ............... 455/436 |
| 2009/0207807 | A1* | 8/2009 | Mahdi et al. ................... 370/331 |
| 2009/0270099 | A1* | 10/2009 | Gallagher et al. ......... 455/435.1 |
| 2010/0189035 | A1* | 7/2010 | Pehrsson et al. ............... 370/328 |

OTHER PUBLICATIONS

Written Opinion of the International Searching Authority (translation) dated (mailed) Dec. 4, 2008, issued in related Application No. PCT/CN2008/072064, filed Aug. 20, 2008, Huawei Technologies Co., Ltd.

ETSI TS 143 318 V.7.2.0(May 2007) Digital cellular telecommunications system (Phase 2+); Generic access to the A/Gb interface; Stage 2 (3GPP TS 43.318 version 7.2.0 Release 7).

3GPP TS 23.401 V1.1.0 (Jul. 2007), erd Generation Partnership Project; Technical Specification Group Services and System Aspects; GPRS enhancements for E-UTRAN access (Release 8).

3GPP TR 23.882 V1.110 (Jul. 2007) 3rd Generation Partnership Project; Technical Specification Group Services and System Aspects; 3GPP System Architecture Evolution: Report on Technical Options and Conclusions (Release 7).

Second Chinese Office Action dated (mailed) Nov. 15, 2011, issued in related Chinese Application No. 200710168085.4 Huawei Technologies Co., Ltd.

3GPP TSG GERAN#33, $3^{rd}$ Generation Partnership Project, Enhanced "A/Gn" architecture, GP 070215, Feb. 2007.

3GPP TS 43.318 V7.2.0 $3^{rd}$ Generation Partnership Project; Technical Specification Group GSM/EDGE Radio Access Network; Generic access to the A/Gb interface; Stage 2, May 2007.

International Search Report from P.R. China in International Application No. PCT/CN2008/072064 mailed Dec. 4, 2008.

Third Chinese Office Action dated (mailed) May 8, 2012, issued in related Chinese Application No. 200710168085.4 Huawei Technologies Co., LTD.

Chinese Patent No. 101374341, issued on Dec. 12, 2012, granted in corresponding Chinese Patent Application No. 200710168085.4.

Extended European Search Report issued in corresponding European Patent Application No. 12191095.4, mailed Feb. 18, 2013.

\* cited by examiner

GENERIC ACCESS NETWORK AND METHOD FOR IMPLEMENTING SERVICES BY USING GENERIC ACCESS NETWORK

CROSS-REFERENCE TO RELATED APPLICATIONS

This application is a continuation of International Application No. PCT/CN2008/072064, filed on 20 Aug., 2008, which claims priorities to Chinese Patent Application No. 200710145281.X, filed on Aug. 21, 2007 and Chinese Patent Application No. 200710168085.4, filed on Nov. 1, 2007, all of which are hereby incorporated by reference in their entireties.

FIELD OF THE INVENTION

The present invention relates to a communication technology, and in particular, to a generic access network and a method for implementing services by using the generic access network.

BACKGROUND OF THE INVENTION

A Universal Mobile Telecommunications System (UMTS) is a third generation mobile communications system that uses the Wideband Code Division Multiple Access (WCDMA) technology. The UMTS is generally called a WCDMA communication system. The UMTS is designed with a structure similar to the structure of a second generation mobile communication system, and includes a Radio Access Network (RAN) and a Core Network (CN). The RAN is configured to process all radio related functions, and the CN is configured to process all voice calls and data connections in the UMTS and configured to implement switching and routing with external networks. Logically, the CN consists of a Circuit Switched (CS) domain and a Packet Switched (PS) domain. The whole UMTS is composed of a UMTS Territorial Radio Access Network (UTRAN), a CN and a User Equipment (UE). The UTRAN includes one or multiple Radio Network Subsystems (RNSs). Each RNS consists of a Radio Network Controller (RNC) and one or multiple NodeBs. The RNC is configured to allocate and control radio resources of the NodeBs connected or related to the RNC. The NodeB converts data streams between an Iub interface and a Uu interface, and manages some radio resources.

Considering the future competitiveness of networks, the 3rd Generation Partnership Project (3GPP) is carrying out a research on new evolved network architecture to meet future mobile network application requirements. The evolved network architecture includes System Architecture Evolution (SAE) and Long Term Evolution (LTE). An evolved access network is called an E-UTRAN. The purpose of network evolution is to provide an all-Internet Protocol (IP) based network, which has the features of low delay, high data rate, high system capacity, wide coverage, and low cost. The UMTS network and SAE network may coexist for a period of time in the evolution from UMTS to SAE. FIG. 1 shows an architecture of an evolved network in the prior art.

As shown in FIG. 1, the E-UTRAN 11 is an RAN in the evolved network; the Mobility Management Entity (MME) 12 is configured to store Mobility Management (MM) contexts of the UE, for example, user ID, mobility state, and Tracking Area (TA) information, and the MME is also configured to authenticate the user; the serving gateway 13 is an entity for terminating the downlink data transmitted to an idle UE, and is configured to trigger paging and store contexts of the UE, for example, IP address and routing information of the UE. The Public Data Network (PDN) gateway 14 is an anchor point of the user plane and remains the same during the user session. The Policy and Charging Enforcement Function (PCEF) is located in the PDN gateway. The Policy and Charging Rules Function (PCRF) 15 is configured to generate a Policy and Charging Control (PCC) rule and push the PCC rule to the PCEF where the PCC rule is enforced. The MME 12 is connected to the Serving GPRS Support Node (SGSN) 16 via the S3 interface. A 2G/3G user may access the SGSN 16 via the UTRAN or the GSM Edge Radio Access Network (GERAN). The evolved architecture is compatible with 2G network and 3G network. The architecture of the evolved network is designed from the perspective of smooth evolution. In early deployment of the evolved network, LTE access network (i.e. E-UTRAN) is deployed in some places only, and not nationwide. This is called hot coverage. Outside hot coverage areas, users can access the network via the UTRAN/GERAN only. Thus, in a handover process incurred when a user moves between the evolved network and the 2G/3G network, the service continuity must be guaranteed when the domain and Radio Access Technology (RAT) are changed.

In addition, it is also important for the evolved network to be compatible with the existing networks. To protect the existing investments of the operators and fully use traditional CS entities, the prior art provides a solution for carrying CS data and signals in a PS domain in an evolved network, that is, an evolved Mobile Switching Center (eMSC) solution. In the eMSC solution, voice call services in an LTE/SAE network are uniformly controlled by the CS domain, and services from different access areas are controlled by a same eMSC, so that the voice call service continuity between the CS domain and the LTE/SAE network can be guaranteed. Nevertheless, the eMSC solution does not describe the detailed architecture of the eMSC solution and how the UE is attached to the eMSC.

A Generic Access Network (GAN) originates from Unlicensed Mobile Access (UMA), and is configured to extend the use of mobile voice and data in GSM/General Packet Radio Service (GPRS) in unlicensed spectrum technologies. For example, Bluetooth and Wireless Local Area Network (WLAN). The purpose of introducing the GAN is to use the WLAN access as a supplement in areas where a GERAN has poor coverage, so that the user can continue using the CS and PS services provided by the core network. The GAN describes how the UE accesses the GERAN (which is composed of a PS domain and a CS domain) from the WLAN and how the UE is handed over between the cellular network and the WLAN to maintain the seamless continuity of the voice and data sessions. In general, a Generic Access Network Controller (GANC) similar to a Base Station Controller/Radio Network Controller (BSC/RNC) is simulated in a WLAN IP network, and a new interface (Up interface) is introduced between the GANC and the UE. The UE is connected to the GANC via an IP transport network. The GANC is responsible for data interactions between a user plane and a control plane to access the GSM network. However, the eMSC solution is only applicable to only the connection between the WLAN and the GERAN, and seamless handover between the cellular network and the WLAN in case of dual radio. With the emergence of radio broadband technologies such as SAE/LTE and Worldwide Interoperability for Microwave Access (WiMAX), a solution for performing seamless handover between the SAE/LTE or WiMAX network and the cellular network in case of single radio (namely, single transmitter and single receiver) must be considered.

SUMMARY OF THE INVENTION

Embodiments of the present invention provide a GAN and a method for implementing services by using the GAN to ensure the voice call continuity between the IP network and the CS domain.

To achieve the preceding objective, the embodiments of the invention provide the following technical solution.

One aspect of the present invention provides a GAN. The GAN is configured to connect a generic IP network with a target network and includes a GANC. The GANC is configured to enable a UE to access the target network via the generic IP network and includes a user interface and a PCC interface. The user interface is configured to connect the UE; and the PCC interface is connected to a PCC system and configured to trigger a bearer establishment process of the generic IP network.

Other aspect of the present invention provides a method for initiating services in a GAN, where the GAN is configured to connect a generic IP network with a target network and includes a GANC. The method includes: a UE initiates a service in the GANC, the target network establishes a bearer from the target network to the GANC according to service requirements, and the GANC triggers a bearer establishment process of the generic IP network according to the service requirement.

Other aspect of the present invention provides a method for performing handover by using a GAN, where the GAN is configured to connect a generic IP network with a target network and includes a GANC. The method includes: the GANC triggers a process of performing handover to the target network and releases resources of the GAN after receiving a resource release instruction from the target network.

In the preceding technical solution, a GAN is introduced based on the existing network, where the GAN is composed of an enhanced GANC that has functions of a BSC/RNC in the traditional CS domain; the UE simulates the access to the traditional CS domain and PS domain via the GANC. Thus, the voice call continuity between the generic IP network and the traditional CS domain is guaranteed.

DETAILED DESCRIPTION OF THE INVENTION

For better understanding of the technical solution of the present invention, the present invention is hereinafter described in detail with reference to the accompanying drawings and embodiments.

Figure 1:
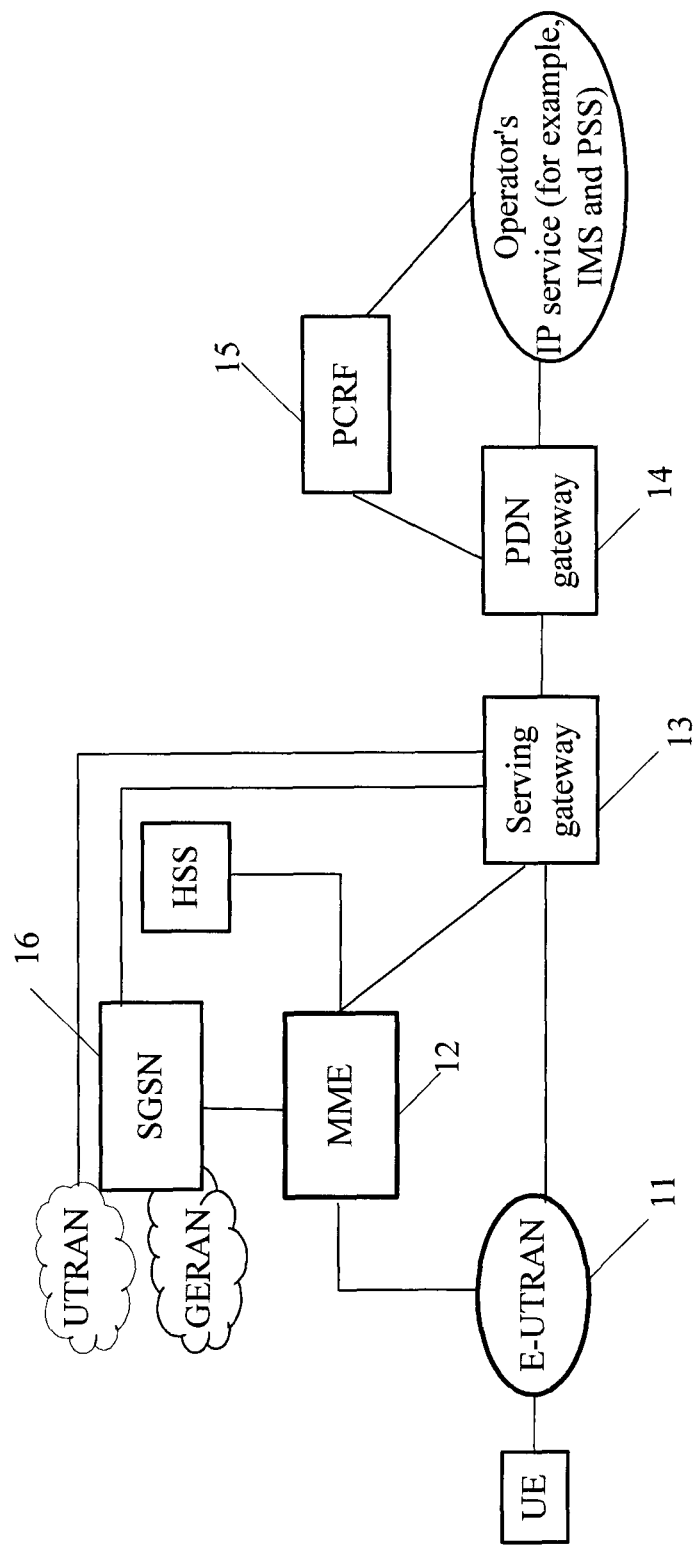
FIG. 1 shows an architecture of an evolved network in the prior art.
Figure 2:
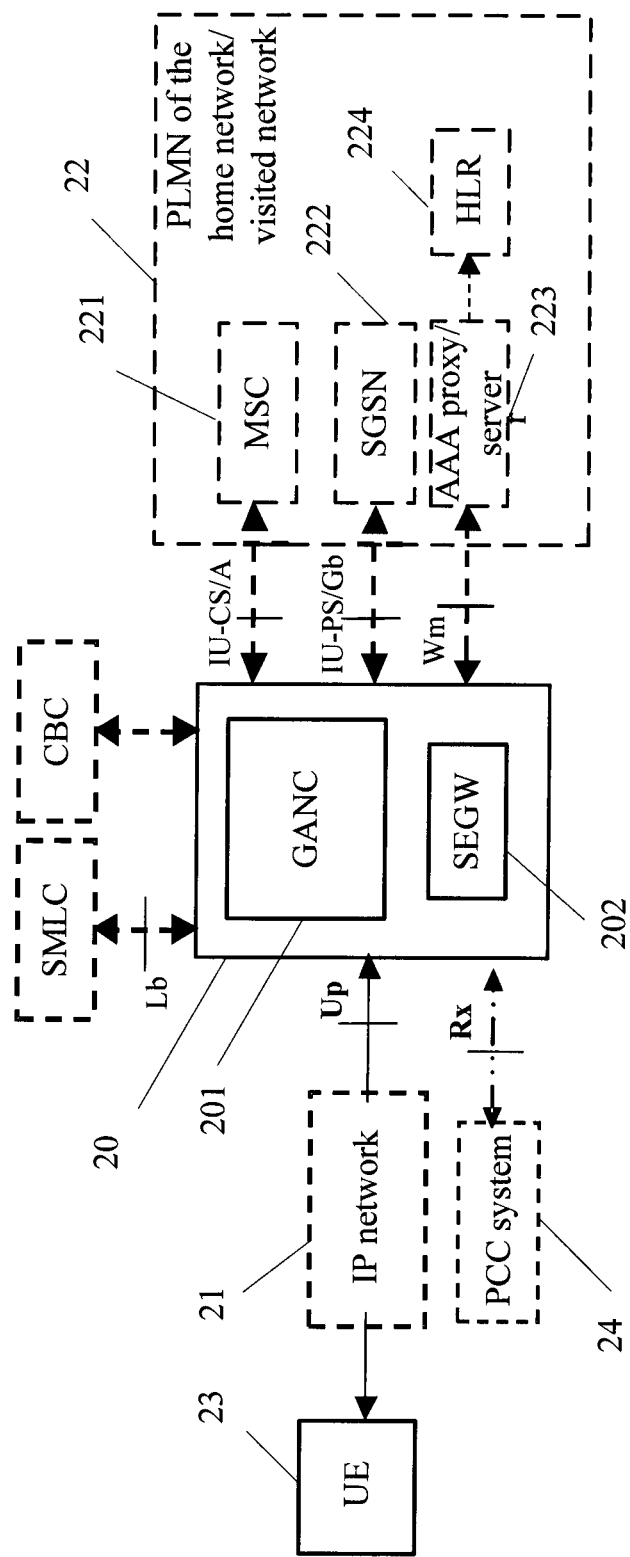
FIG. 2 is a schematic diagram illustrating the networking between a GAN, other communication networks, and a UE in an embodiment of the present invention.

FIG. 2 is a simplified schematic diagram illustrating the networking between a GAN, other communication networks, and a UE in an embodiment of the present invention.

As shown in FIG. 2, a GAN 20 is connected to a generic IP network 21 and a radio network 22, so that a UE 23 accesses a CS domain and a PS domain of the radio network 22 via the generic IP network 21. This guarantees the voice connectivity between the generic IP network and the CS domain and the service continuity between heterogeneous IP networks.

The GAN 20 includes a GANC 201, and has some functions of a BSC or an RNC in a traditional CS domain or PS domain, that is, functions of enabling the UE to access the CS domain or PS domain of the radio network via the generic IP network. The GANC 201 provides the following interfaces:

- a user interface Up, configured to connect the generic IP network 21;
- a CS domain interface IU-CS/A, configured to connect a CS device of the radio network 22, for example, an MSC 221 shown in FIG. 2;
- a PS domain interface IU-PS/Gb, configured to connect a PS device of the radio network 22, for example, an SGSN 222 shown in FIG. 2, and optional if the CS domain needs to be accessed via the GANC 201 only; and
- a PCC interface Rx, configured to connect to a PCC system 24.

In addition, the GANC 201 may also provide interfaces for connecting the existing Serving Mobile Location Center (SMLC) and Cell Broadcast Center (CBC).

Further, the GAN 20 may further include a radio functional entity of the generic IP network system (not shown in FIG. 2), and GANC 201 provides interfaces with the radio functional entity accordingly. For example, when the radio network 22 is an SAE/LTE network, the GAN 20 includes an evolved NodeB (eNodeB); accordingly, the interface between the GANC 201 and the SAE/LTE network is an S1-MME/S1-U interface. When the radio network is a 3GPP2 1X network, the GAN 20 includes a 3GPP2 radio entity; accordingly, the interfaces between the GANC 201 and the 3GPP2 1X network are A10/A11 and A13/A8/A9. When the radio network is an Ultra-Wideband (UMB) network, the GAN 20 includes a UMB radio entity—evolved Base Station (eBS) or RNC; accordingly, the interface between the GANC and the UMB network is U1, U2, or U3. When the radio network is a WiMAX network, the GAN 20 includes a WiMAX radio entity ASN/BS or RNC; accordingly, the interface between the GANC and the WiMAX network is R4 or R6.

In addition, the Rx interface is a 3GPP-based PCC interface. If the radio network is a specific IP network (for example, a UMB network or a WiMAX network), the interface between the GAMC and the IP network is the PCC interface of the IP network.

The UE 23 simulates the registration in the PS domain or CS domain and the transmission of service signaling messages by establishing a logical channel with the GANC 201 via the Up interface, to simulate the access to the traditional CS domain and PS domain via the GANC 201.

When the UE 23 needs to initiate PS or CS services, the GANC 201 triggers the PCC system 24 of the generic IP network via the Rx interface to establish a dedicated bearer to transmit service data streams, for example, voice call media streams. The UE 23 transmits media plane data of the service data streams to the GANC 201 via the dedicated bearer, and to a remote UE via the radio network 22, and vice versa. For example, via the MSC 221 or the SGSN 222 in the CN shown in FIG. 2.

The GANC 20 may be integrated into the MSC 221.

The GAN 20 may further include a Security Gateway (SEGW) 202 connected to the GANC 201. The Security Gateway 202 is configured to perform security check, including bidirectional authentication, data encryption and data integrity check. The SEGW 202 includes a Wm interface between the AAA proxy/server 23 in the radio network 22 and the SEGW 202.

In this embodiment, the generic IP network 21 may be an SAE network, an LTE network, a WiMAX network, a 3GPP2 UMB network or a 3GPP2 1X network. This architecture is also applicable to other specific IP networks.

For the SAE/LTE network or WIMAX network, the SEGW 202 in the GAN 20, the AAA proxy/server 23 in the radio network 22 and the Home Location Register (HLR) 224 are optional.

The following discovery mechanisms may be used to discover the GANC.

(a) The GANC information is configured in a radio functional entity in the GAN 20, for example, the radio functional entity may be the BS of the WiMAX access system or the eNodeB of the SAE/LTE system, and the GANC information may be broadcasted to the UE via the radio functional entity in the GAN 20.

(b) The UE initiates a process similar to a Dynamic Host Configuration Protocol (DHCP)/Domain Name System (DNS) to obtain the address of the GANC. For example, fields in the DHCP/DNS request message are extended for the UE to obtain the address of the GANC, or the UE requests the address of the GANC in the DHCP/DNS via a Mobile Station Integrated Services Digital Network Number (MSISDN) allocated for the UE in the Telephone Uniformed Resource Locator (Tel-URL) format.

(c) The UE searches the DNS according to the location information (for example, TA or cell ID of the SAE/LTE system or combination of the TA and the cell ID) broadcasted by the radio functional entity in the GAN 20 to obtain the address of the GANC.

(d) The UE searches the GANC according to the location information broadcasted by the radio functional entity in the GAN 20 for a list of proper GANCs to serve the current UE, for example, the location information may be TA or cell ID of the SAE/LTE system or combination of the TA and the cell ID.

(e) A group of cells in the GAN 20 is configured as a virtual Location Area (LA), and LA information is configured in the radio functional entity of the GAN 20. The radio functional entity of the GAN 20 broadcasts the LA information. When a UE entering the LA receives the LA information, the UE selects a GANC serving the LA according to the received LA information, and executes a LA Update (LAU) process.

The following further describes the networking structure between a GANC in a GAN and a generic IP network, supposing the generic IP network is an SAE/LTE network or a WiMAX network.

Figure 3:
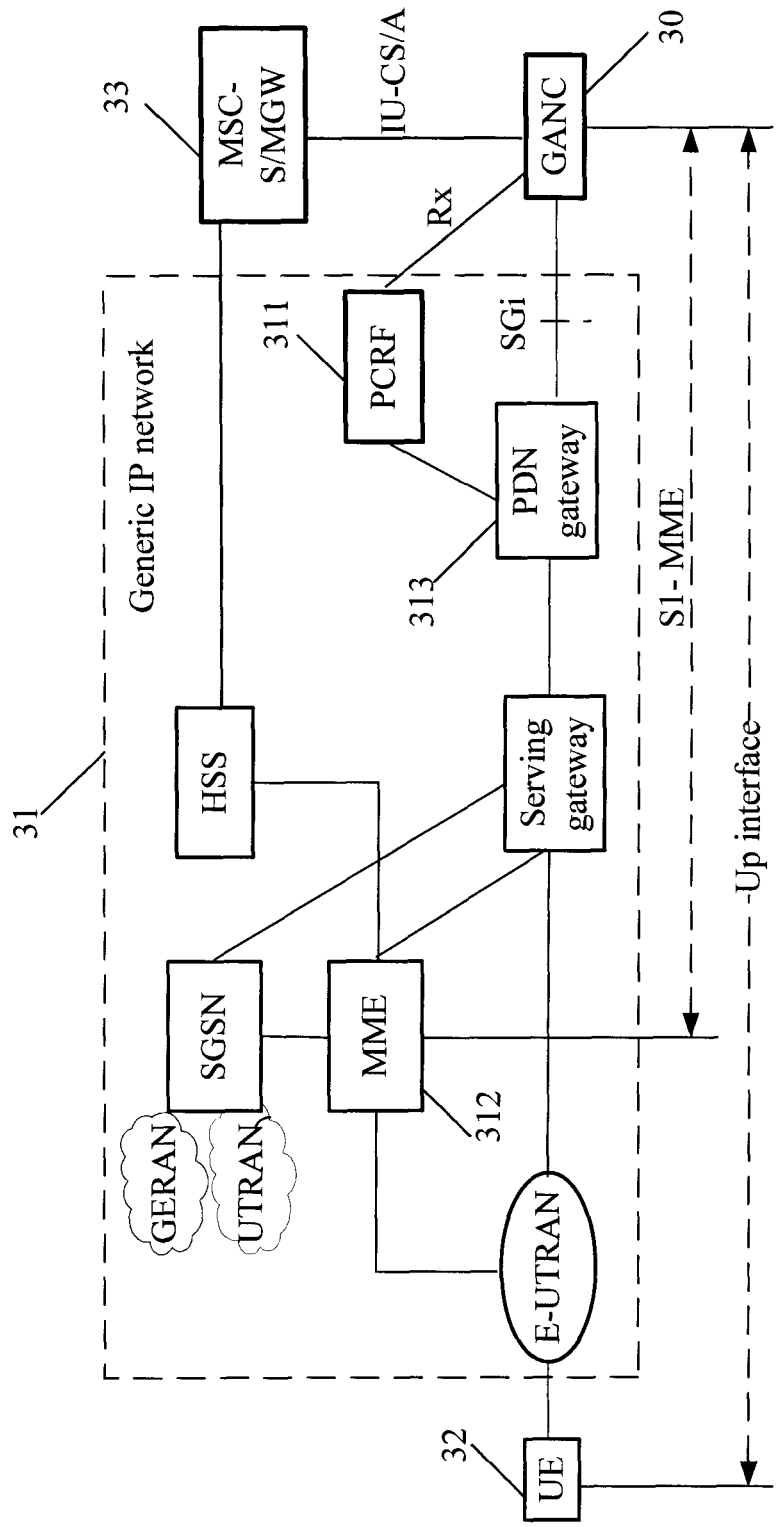
FIG. 3 shows an architecture of a GAN based on SAE/LTE in an embodiment of the present invention.

FIG. 3 shows a simplified architecture of a GAN based on SAE/LTE in an embodiment of the present invention.

In FIG. 3, a generic IP network is an SAE/LTE network 31, the structure of which is already described in the prior art. A GANC 30 is connected to a PCRF 311 in the SAE/LTE network 31 via an Rx interface and connected to a PDN gateway 313 via a SGi interface.

In this embodiment, the GANC 30 may further include an eNodeB functional entity of the SAE/LTE, that is, a GANC-eNodeB. An interface between the GANC-eNodeB and an MME 312 is S1-MME, and an interface between the GANC-eNodeB and a serving gateway (serving GW) is an S1-U interface.

When a UE 32 needs to initiate PS or CS services, the UE 32 establishes a logical channel with the GANC 30 via an Up interface to simulate the registration in a PS or CS domain and transmit service signaling messages. The GANC 30 triggers the PCRF 311 in the SAE/LTE network to establish a dedicated SAE/LTE bearer via the Rx interface to transmit service data streams, for example, voice call media streams. The UE 32 transmits media plane data of the service data streams to the GANC 30 via the dedicated SAE/LTE bearer and to a remote UE via the CN, and vice versa. For example, via an MSC Server/Media Gateway (MSC-S/MGW) in the CS shown in FIG. 3.

Figure 4:
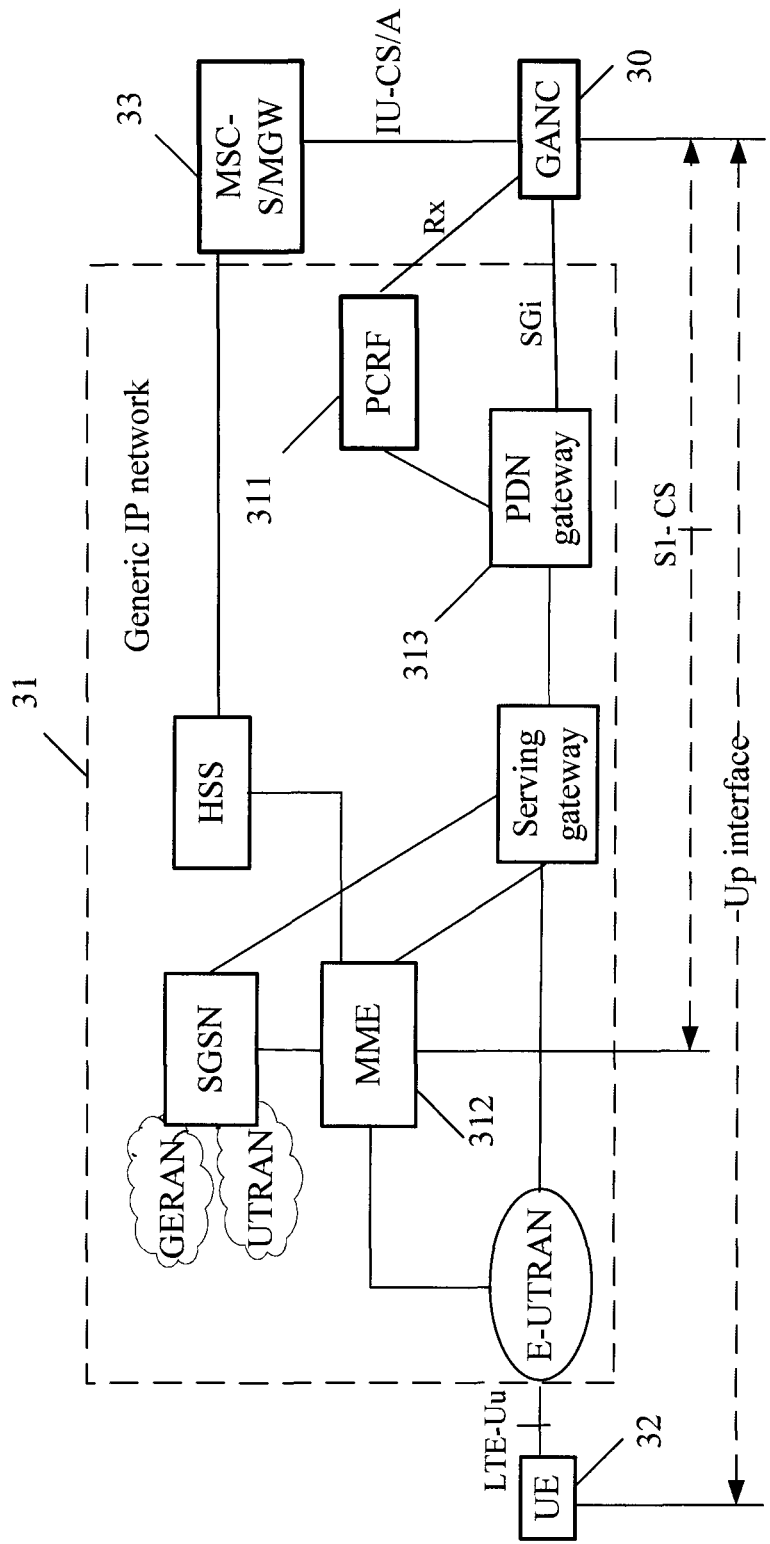
FIG. 4 shows another architecture of a GAN based on SAE/LTE in an embodiment of the present invention.

FIG. 4 shows another architecture of a GAN based on the SAE/LTE in an embodiment of the present invention.

The network architecture shown in FIG. 4 is basically the same as that shown in FIG. 3 except for the following differences: a new interface, for example, S1-CS interface, is introduced between an MME 312 and a GANC 30 to transmit signaling messages; that is, a UE 32 sends a signal of the GAN via a Non Access Stratum (NAS) message to the MME 312; the MME 312 forwards the signaling message of the GAN to the GANC 30 via the S1-CS interface.

Figure 5:
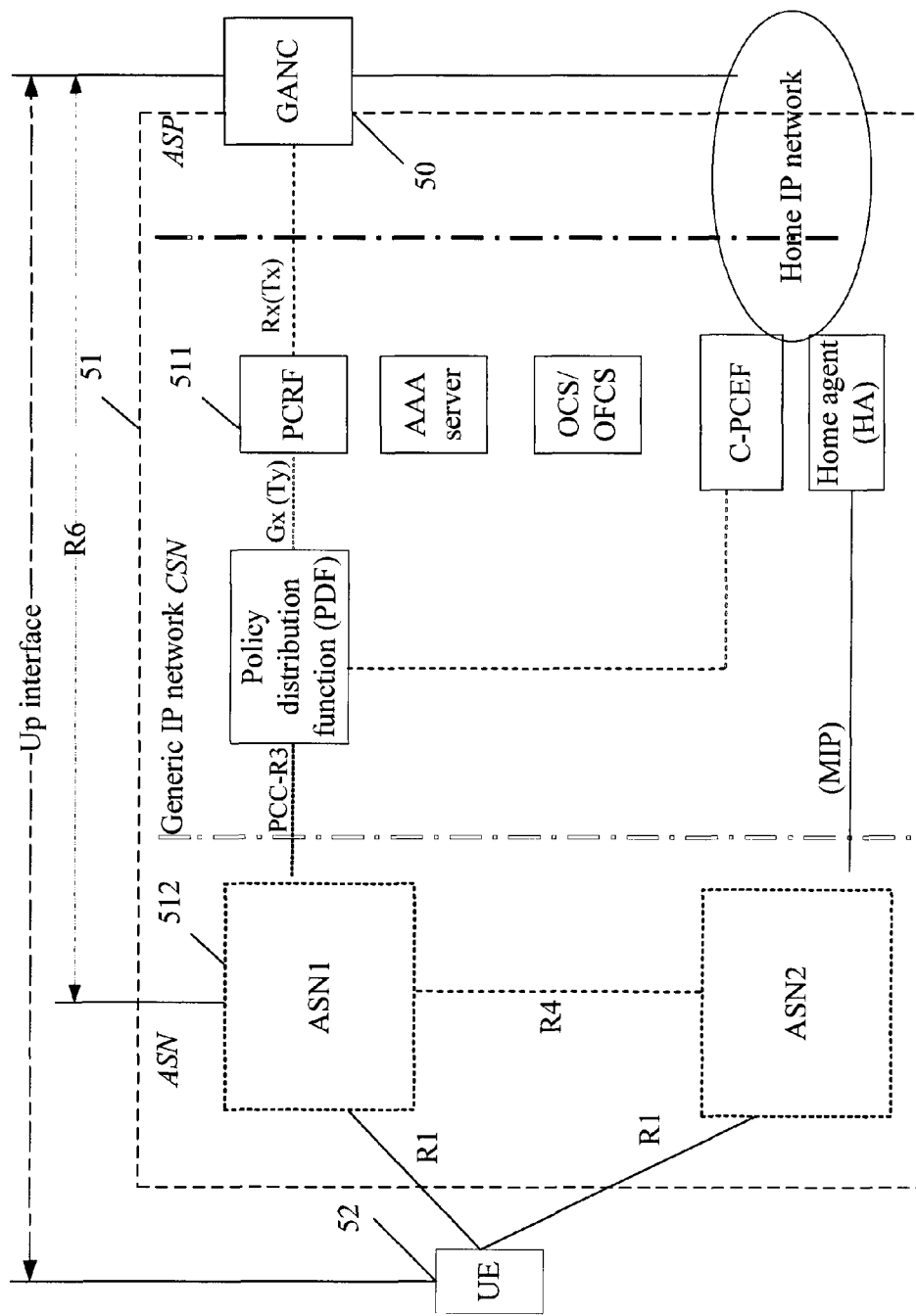
FIG. 5 shows an architecture of a GAN based on WiMAX in an embodiment of the present invention.

FIG. 5 shows a simplified architecture of a GAN based on WiMAX in an embodiment of the present invention.

A generic IP network is a WiMAX network 51 in the prior art. A GANC 50 is connected to a PCRF 511 in the WiMAX network 51 via an Rx interface.

In this embodiment, the GANC 50 may further include a BS functional entity in the WiMAX network, that is, a GANC-BS. The interface between the GANC-BS and the Access Service Network (ASN) 512 is an R6 interface.

When a UE 52 needs to initiate PS or CS services, the UE 52 establishes a logical channel with the GANC 50 to simulate the registration in a PS or CS domain and transmit service signaling messages. The GANC 50 triggers the PCRF 511 in the WiMAX network to establish a dedicated WiMAX bearer via the Rx interface to transmit service data streams, for example, voice call media streams. The UE 52 transmits media plane data of the service data streams to the GANC 50 via the dedicated WiMAX bearer and to a remote UE via the CN, and vice versa. For example, via the MSC-S/MGW or the SGSN in the CN.

In the foregoing embodiments of the present invention, after a GAN is introduced, a CS network may be accessed via other IP networks such as an SAE/LTE network or a WiMAX network, and the handover between other IP networks such as the SAE/LTE network or WiMAX network and the CS domain may be implemented with little impact on the existing SAE/LTE system and the GERAN/UTRAN system. In addition, the GAN may reuse a PCC system in the existing generic IP network, with few changes to each interface. With the network architecture based on single radio, the voice connectivity between the IP generic network and the CS domain and the service continuity between heterogeneous IP networks may be guaranteed.

Based on the network architectures provided in the foregoing embodiments, this embodiment also provides a method for implementing services of a GAN. The following describes several processes involved in the method provided in this embodiment.

When a UE accesses a GAN via a generic IP network, for example, the SAE/LTE network or the WiMAX network, the GAN needs to understand the type of the generic IP network where the UE accesses. For example, when the UE registers with the GAN, the type of the generic IP network where the IP accesses needs to be reported to a GANC. When the UE initiates a voice call service or receives a voice call service, the GANC triggers a bearer establishment process of the generic IP network according to the type of the generic IP network, and guarantees the Quality of Service (QoS).

When the UE registers with the GAN, the UE needs to establish a Generic Access-Circuit Switched Resource (GA-CSR)/Generic Access-Packet Switched Resource (GA-PSR) connection. After establishing the GA-CSR/GA-PSR connection, the UE initiates a registration request to the GAN. Then, the registration process ends.

Figure 6:
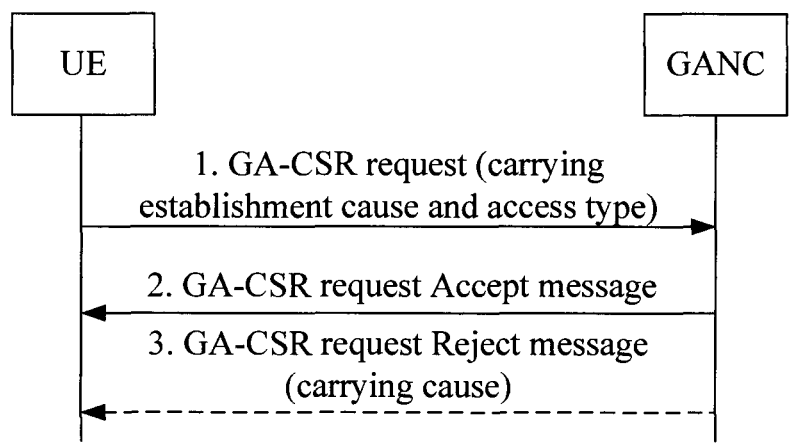
FIG. 6 shows a GA-CSR connection establishment process when a UE registers with a GAN in a method embodiment of the present invention.

FIG. 6 shows a GA-CSR connection establishment process when a UE registers with a GAN in a method embodiment of the present invention.

The GA-CSR connection establishment process includes the following content.
1. The UE sends a GA-CSR request to a GANC, where the GA-CSR request includes the establishment cause and access type.
2. After receiving the GA-CSR request, the GANC returns a GA-CSR request accept message to the UE if the UE access is allowed.
3. After receiving the GA-CSR request, the GANC returns a GA-CSR request reject message to the UE if the UE access is denied. The reject message may carry a reject cause.

After the UE registers with the GAN, it can implement a voice call service process via the GAN.

Figure 7:
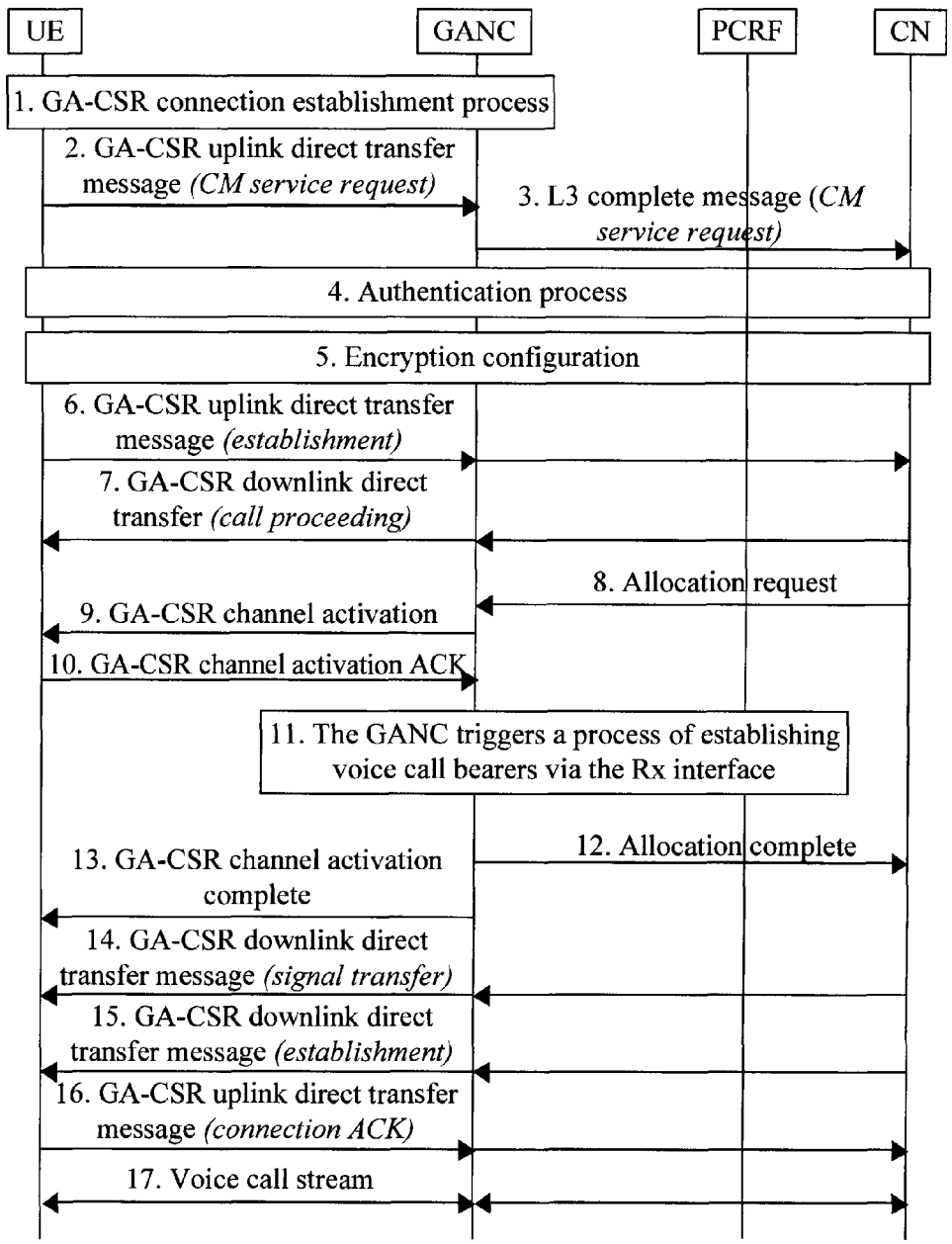
FIG. 7 shows a voice call origination process in a method embodiment of the present invention.

FIG. 7 shows a voice call origination process in a method embodiment of the present invention.

Supposing an IP network is an SAE/LTE network or a WiMAX network, the process describes how a UE initiates a voice call in a GAN. The process includes the following content.
1. The UE establishes a GA-CSR connection, that is, a logical channel between the UE and the GANC.
2. According to an upper layer service request, the UE sends a Connection Management (CM) service request to a GANC via a GA-CSR uplink direct transfer message.
3. The GANC establishes a Signaling Connection Control Part (SCCP) connection with a CN, and forwards the CM service request to the CN.
4. The CN authenticates the UE by using a standard GERAN authentication process.
5. The CN encrypts information by using a standard GERAN encryption negotiation process.
6. The UE sends a setup message to the GANC via a GA-CSR uplink direct transfer message, and the GANC forwards the setup message to the CN.
7. After receiving the setup message, the CN sends a call proceeding message to the GANC, and the GANC forwards the call proceeding message to the UE via the GA-CSR uplink direct transfer message.
8. The CN requests the GANC for assigned resources by sending an assignment request.
9. The GANC sends a GA-CSR channel activation command to the UE, where the command includes the following bearer establishment information:
   channel mode;
   voice coding/decoding related information;
   IP address of the uplink Real Time Protocol (RTP) stream and User Datagram Protocol (UDP) port number allocated by the GANC.
10. The UE sends a GA-CSR channel activation ACK to the GANC to indicate the IP address of the uplink RTP stream and the UDP port number.
11. The GANC determines whether to trigger a voice bearer establishment process via an Rx interface according to the IP addresses of the uplink and downlink RTP streams, the UDP port number, and the type of IP network where the UE accesses.

The GANC determines to trigger the voice bearer establishment process via the Rx interface in the following cases:
   if the IP network is an SAE/LTE network, the GANC triggers the voice bearer establishment process of the SAE/LTE network via the Rx interface;
   if the IP network is a WiMAX network, the GANC triggers the voice bearer establishment process of the WiMAX network via the Rx interface;
   if the IP network is any other network, the GANC triggers the voice bearer establishment process of the network via the Rx interface.
12. The GANC sends an assignment complete message to the CN to indicate that call resources are reserved completely.
13. The GANC sends a GA-CSR channel activation complete message to the UE to indicate that the voice bearer is reserved completely and that an end-to-end voice path is already established.
14. The CN sends an alerting message to the GANC, and the GANC forwards the alerting message to the UE via the GA-CSR uplink direct transfer message.
15. The CN sends a connect message to the GANC, and the GANC forwards the connect message to the UE via the GA-CSR uplink direct transfer message.
16. The CN sends a connect ACK to the GANC via the GA-CSR uplink direct transfer message, and the GANC forwards the connect ACK to the CN.

17. The UE sends and receives voice data streams via the GANC and the CN.

Figure 8:
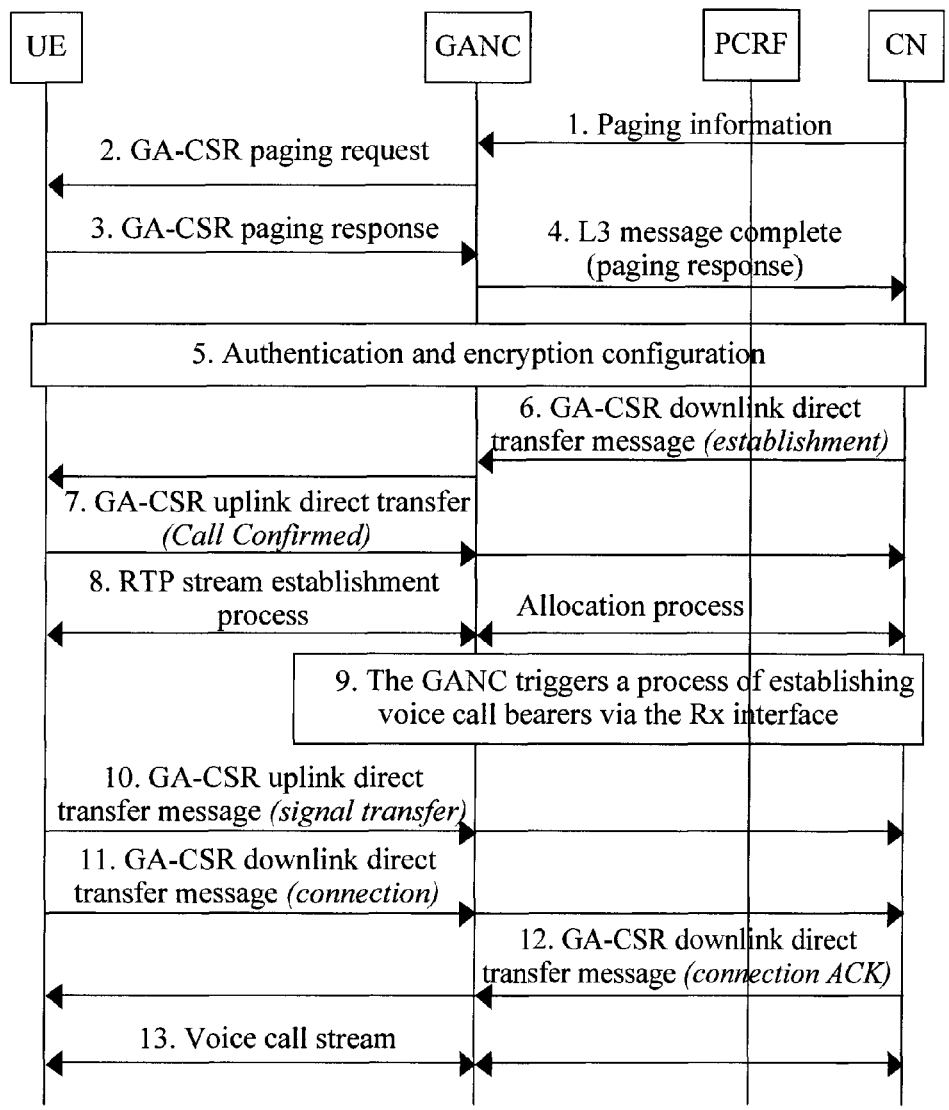
FIG. 8 shows a voice call termination process in a method embodiment of the present invention.

FIG. 8 shows a voice call termination process in a method embodiment of the present invention.

Supposing an IP network is an SAE/LTE network or a WiMAX network, the process describes how the UE initiates a voice call as the called party in the GAN. The process includes the following content.

1. A CN sends a paging message to a GANC.
2. The GANC pages a UE via a GA-CSR paging request.
3. The UE sends a GA-CSR paging response to the GANC, the GA-CSR paging response includes a classmark and an encryption key sequence number of the UE.
4. The GANC forwards the paging response to the CN via Complete Layer 3 Information.
5. The CN authenticates the UE by using a standard GERAN authentication process and negotiates encryption information by using a standard GERAN encryption negotiation process.
6. The CN sends a setup message to the GANC via a GA-CSR uplink direct transfer message, and the GANC forwards the setup message to the UE.
7. The UE sends a call confirmed message to the GANC via a GA-CSR uplink direct transfer message, and the GANC forwards the call confirmed message to the CN.
8. The UE establishes an RTP stream with the GANC in the following two modes:
8a. The GANC sends a GA-CSR channel activation command to the UE, where the command includes the following bearer establishment information:
   channel mode;
   voice coding/decoding related information;
   IP address of the uplink RTP stream and the UDP port number allocated by the GANC.
8b. The UE sends a GA-CSR channel activation ACK to the GANC to indicate the IP address of the downlink RTP stream and the UDP port number.
9. The GANC determines whether to trigger a voice bearer establishment process via an Rx interface according to the IP addresses of the uplink and downlink RIP streams, the UDP port number, and the type of IP network where the UE accesses.

The GANC determines to trigger the voice bearer establishment process via the Rx interface in the following cases:
   if the IP network is an SAE/LTE network, the GANC triggers the voice bearer establishment process of the SAE/LTE network via the Rx interface;
   if the IP network is a WiMAX network, the GANC triggers the voice bearer establishment process of the WiMAX network via the Rx interface;
   if the IP network is any other network, the GANC triggers the voice bearer establishment process of the network via the Rx interface.
10. The UE sends an alerting message to the GANC via a GA-CSR uplink direct transfer message, and the GANC forwards the alerting message to the CN.
11. The UE sends a connect message to the GANC via a GA-CSR uplink direct transfer message, and the GANC forwards the connect message to the CN.
12. The CN sends a connect ACK to the GANC, and the GANC forwards the connect ACK to the UE via the GA-CSR uplink direct transfer message.
13. The UE sends and receives voice data streams via the GANC and the CN.

Via the embodiments shown in FIG. 7 and FIG. 8, with the method provided in the present invention, the CS network may be connected via IP networks such as the SAE/LTE network or the WiMAX network, and the voice call continuity between the generic IP network and the traditional CS domain can be guaranteed.

The foregoing FIG. 7 and FIG. 8 are also applicable to the triggering of services between IP networks.

Based on a GAN provided in embodiments of the present invention, the handover between the GAN and a GERAN, a UTRAN or other networks may be implemented. The following supposes that the target network is the GERAN.

Figure 9:
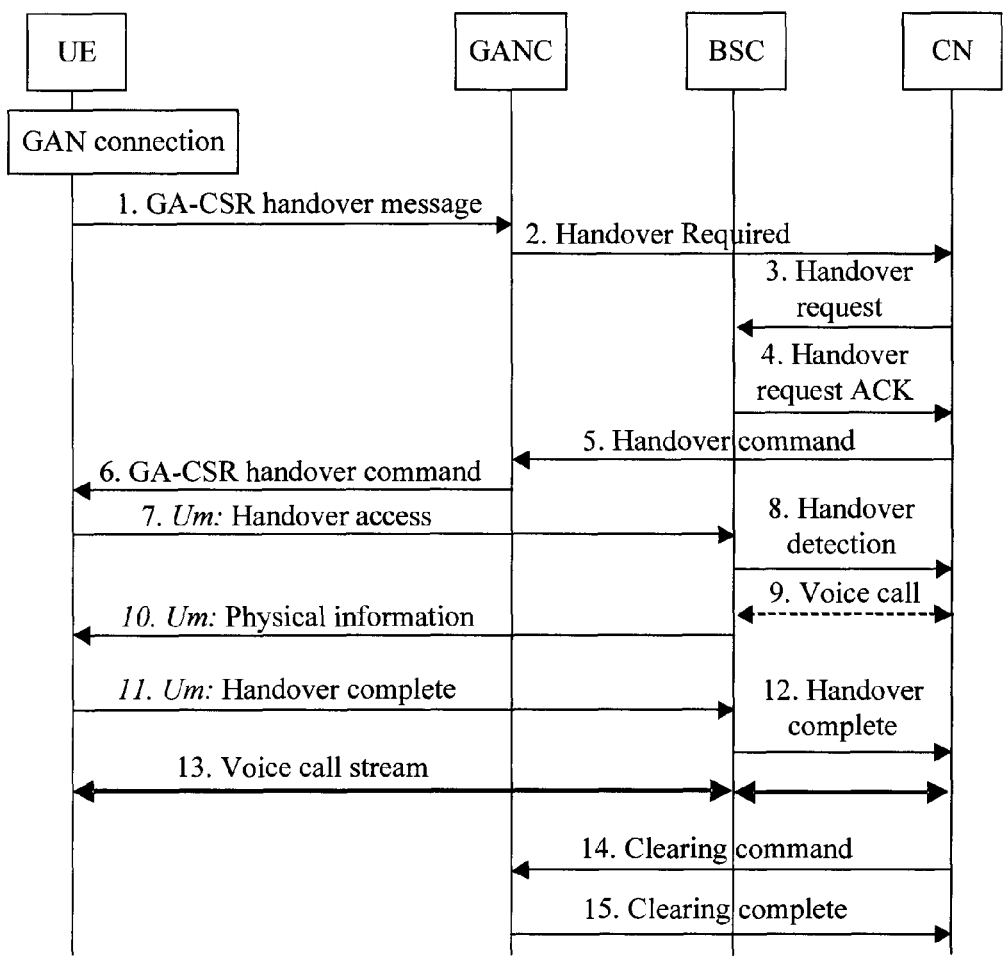
FIG. 9 shows a process of handover from a GAN to a GERAN in a method embodiment of the present invention.

FIG. 9 shows a process of handover from a GAN to a GERAN in a method embodiment of the present invention. The process is also applicable to a case where the target network is the UTRAN or other specific networks.

In this embodiment, it is supposed that a GANC is separate from an MSC in a CN. The handover process is also applicable to a case where the GANC and the MSC are located in a same physical entity. The process includes the following content.

1: A UE sends a measurement report to the GANC via a GA-CSR handover message. The GANC determines whether to hand over the UE to a GERAN according to the measurement report.
2: If the GANC determines to hand over the UE to the GERAN according to the measurement report, the GANC generates a standard CS-CS handover request, and sends the standard CS-CS handover request to the MSC in the CN to trigger a standard CS-CS handover.
3: The CN sends a handover request to a target BSC.
4: The target BSC sends a handover request ACK to the CN.
5: The CN sends a handover command message to a source BSC, that is, the GANC.
6: The GANC instructs the UE to perform handover to a target cell via a GA-CSR handover command, which includes radio resources of the target cell. After receiving the message, the UE may trigger a releasing of GAN registration related information.
7-10: The UE accesses the target cell. This process is similar to that in the prior art.
11-13: The UE finishes accessing the target cell.

In step 7 and step 11, Um indicates an air interface between the UE and the BSC.

14: The CN sends a clearing command to instruct the GANC to release resources. After receiving the command, the GANC may trigger the following operations:
   a. Trigger a process of releasing voice bearers via the Rx interface. If the GANC has functions of the eNodeB or the BS, the GANC also needs to trigger the releasing of other resources;
   b. Trigger the setting of voice bearers to be inactive via the Rx interface so that the UE is not handed over from the GERAN to the GANC, for example, from the GERAN to the WiMAX network or the SAE/LTE network.
15: The GANC sends a clearing complete message indicating that related resources are already released to the CN.

In this embodiment, the UE establishes a direct connection with the GANC via a user plane of the generic IP network, to finish the handover from the GAN to the GERAN.

In a GAN based on SAE/LTE or WiMAX network, a UE may also establish a connection with a GANC via a signaling plane of the SAE/LTE or WiMAX network, to finish the handover from the GAN to a GERAN. The following describes these cases in detail.

Figure 10:
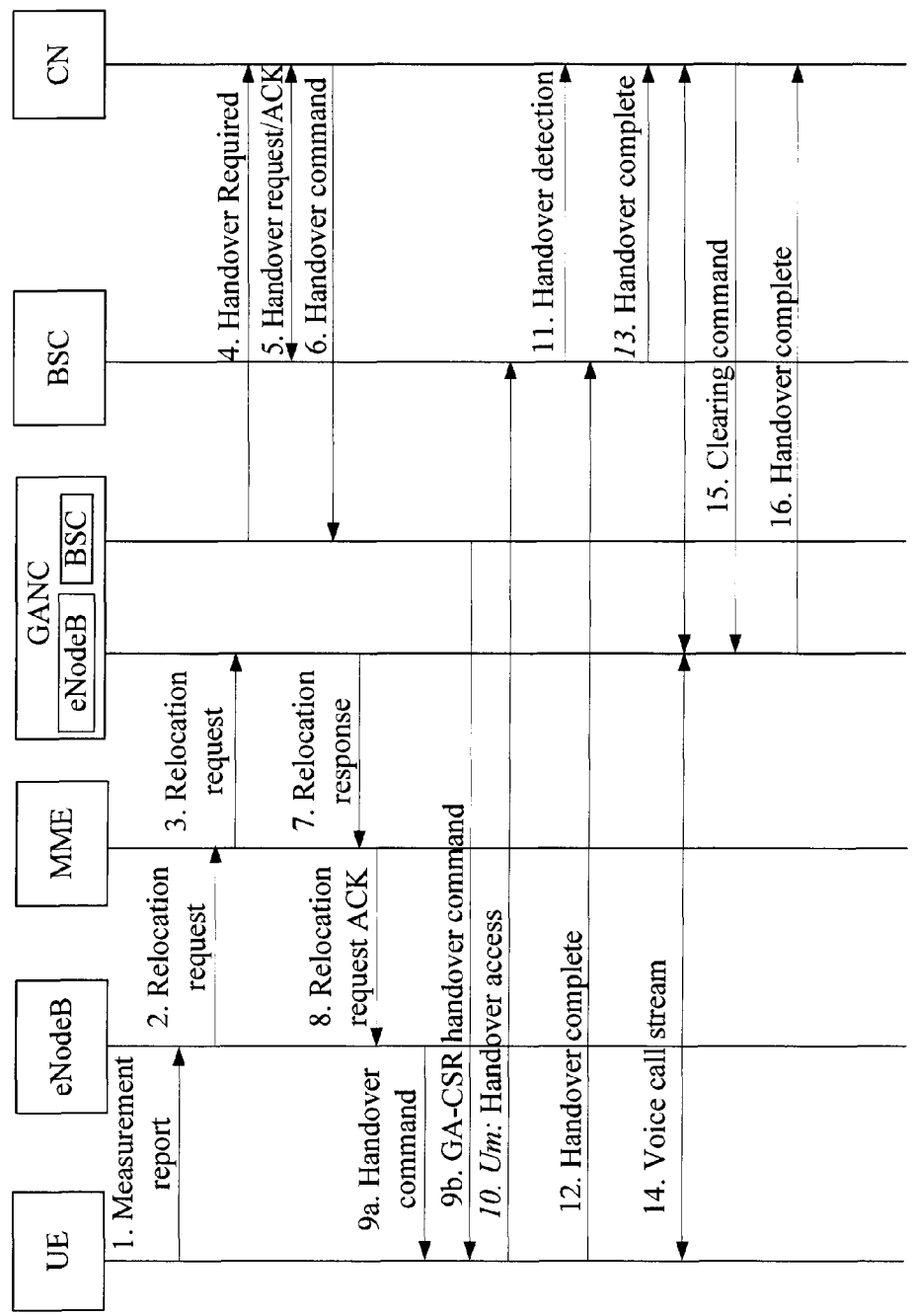
FIG. 10 shows a process of handover from a GAN based on SAE/LTE to a GERAN in a method embodiment of the present invention.

FIG. 10 shows a process of handover from a GAN based on SAE/LTE to a GERAN in a method embodiment of the present invention. The process is also applicable to the case where the target network is a UTRAN or other specific networks.

In this embodiment, it is supposed that a GANC is separate from an MSC in a CN. The handover process is also applicable to the case where the GANC and the MSC are located in a same physical entity. The process includes the following content.

1: A UE sends a measurement report to an eNodeB. The eNodeB determines whether to hand over the UE to the GERAN according to the measurement report.
2: If the eNodeB determines to hand over the UE to the GERAN according to the measurement report, the eNodeB generates a standard PS-PS handover request, and sends a handover required message to the MME.
3: From the perspective of an SAE/LTE network, a GERAN cell is used as a pseudo LTE cell. A serving MME of the UE configures related information to send a standard PS-PS message (for example, an inter-eNodeB handover message) generated by the MME to a GANC-eNodeB. Or the MME sends a handover command to the GANC via a S1-CS interface, instructing the GANC to trigger a inter-BSC (or inter-MSC) handover.
4: A GANC-BSC generates a standard CS-CS handover request, and sends the request to the MSC in the CN, to trigger a standard CS-CS handover.
5: The CN sends the handover request to a target BSC. The target BSC reserves related resources, and then sends a handover request ACK to the CN.
6: The CN sends a handover command to a source BSC, that is, the GANC-BSC.
7: The GANC-eNodeB sends a relocation response to the MME, where the response includes CS resources allocated by the target BSC, or forwards a handover command to the MME via the S1-CS interface.
8: The MME sends a relocation request ACK to a source eNodeB.
9: The GANC may notify the UE of performing handover via the following two ways.
  a. The source eNodeB instructs the UE to perform handover to a target cell via a handover command, which includes radio resources of the target cell. After receiving the message, the UE may trigger the release of GAN registration related information.
  b. The GANC instructs the UE to perform handover to the target cell directly via a GA-CSR handover command, which includes radio resources of the target cell. After receiving the message, the UE may trigger the release of GAN registration related information.
10-11: The UE accesses the target cell. This process is similar to that in the prior art.
12-14: The UE finishes accessing the target cell. This process is similar to that in the prior art.
15: The CN sends a clearing command to instruct the GANC to release resources. After receiving the command, the GANC may trigger the following operations.
  a. Trigger a process of releasing voice bearers via the Rx interface. If the GANC has functions of an eNodeB or a BS, the GANC may also trigger the release of other resources.
  b. Trigger the setting of voice bearers to be inactive via the Rx interface so that the UE is not handed over the GERAN to the GANC, for example, from the GERAN to the WiMAX network or the SAE/LTE network.
16: The GANC sends a clearing complete message indicating that related resources are already released to the CN.

Figure 11:
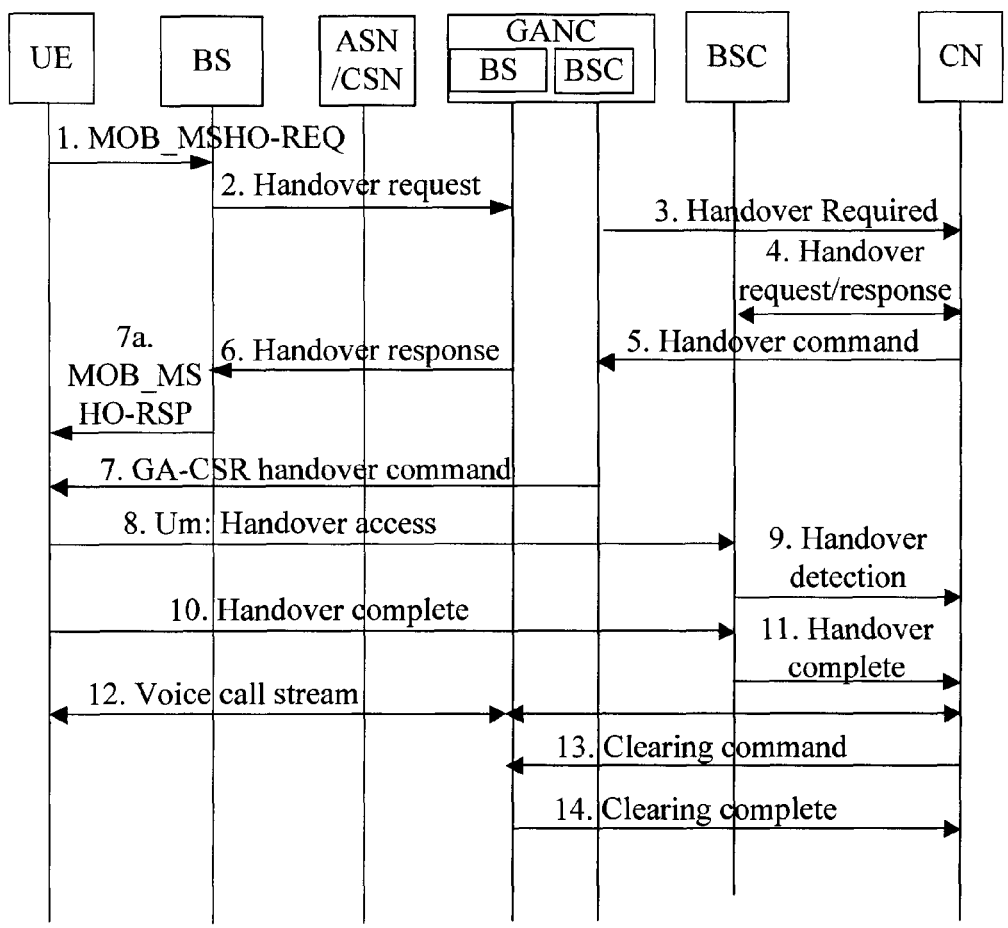
FIG. 11 shows a process of handover from a GAN based on WiMAX to a GERAN in a method embodiment of the present invention.

FIG. 11 shows a process of handover from a GAN based on WiMAX to a GERAN in a method embodiment of the present invention. The process is also applicable to a case where a target network is a UTRAN or other specific networks.

In this embodiment, it is supposed that a GANC is separate from an MSC in a CN. The handover process is also applicable to the case where the GANC and an MSC are located in a same physical entity. The process includes the following content.

Related information is configured in a WiMAX network, so that the GERAN is a pseudo WiMAX network from the perspective of the WiMAX network.

1: A UE sends a handover command, for example, MOB_MSHO-REQ, to a source BS, the handover command includes a potential list of target BSs (including a GANC-BS).
2: The source BS sends a handover request (HO_Req) to the target BSs including the GANC-BS.
3: The GANC-BSC generates a standard CS-CS handover request, and sends the request to the MSC in the CN, to trigger a standard CS-CS handover.
4: The CN sends the handover request to the target BSC. The target BSC reserves related resources, and then sends a handover request ACK to the CN.
5: The CN sends a handover command to the source BSC.
6: The GANC-BS sends a handover response (HO_Rsp) to the BS, where the handover response includes CS resources allocated by the target BSC.
7: The GANC may notify the UE of performing handover via the following two ways.
  a. The source BS instructs the UE to perform handover to a target cell via a MOB_MSHO-RSP message, which includes radio resources of the target cell. After receiving the message, the UE may trigger the release of GAN registration related information.
  b. The GANC instructs the UE to perform handover to the target cell directly via a GA-CSR handover command, which includes radio resources of the target cell. After receiving the message, the UE may trigger the release of GAN registration related information.
8-9: The UE accesses the target cell. This process is similar to that in the prior art.
10-12: The UE finishes accessing the target cell. This process is similar to that in the prior art.
13: The CN sends a clearing command to instruct the GANC to release resources. After receiving the clearing command, the GANC may trigger the following operations:
  a. Trigger a process of releasing voice bearers via an Rx interface. If the GANC has functions of an eNodeB or a BS, the GANC may also trigger the release of other resources.
  b. Trigger a setting of voice bearers to be inactive via the Rx interface so that the UE is not handed over from the GERAN to the GANC, for example, from the GERAN to the WiMAX network or the SAE/LTE network.
14: The GANC sends a clearing complete message indicating that related resources are already released to the CN.

In the foregoing processes shown in FIG. 9, FIG. 10 and FIG. 11, The UE establishes a connection with the GANC via the user plane or the signaling plane of a GAN (for example, the SAE/LTE network or the WIMAX network), to finish the handover from the GAN to the GERAN or the UTRAN and other specific networks. In addition, the UE may establish a connection with the GANC via the user plane or the signaling plane to finish the handover from the GAN to the GERAN or the UTRAN and other specific networks. Details are as follows.

Figure 12:
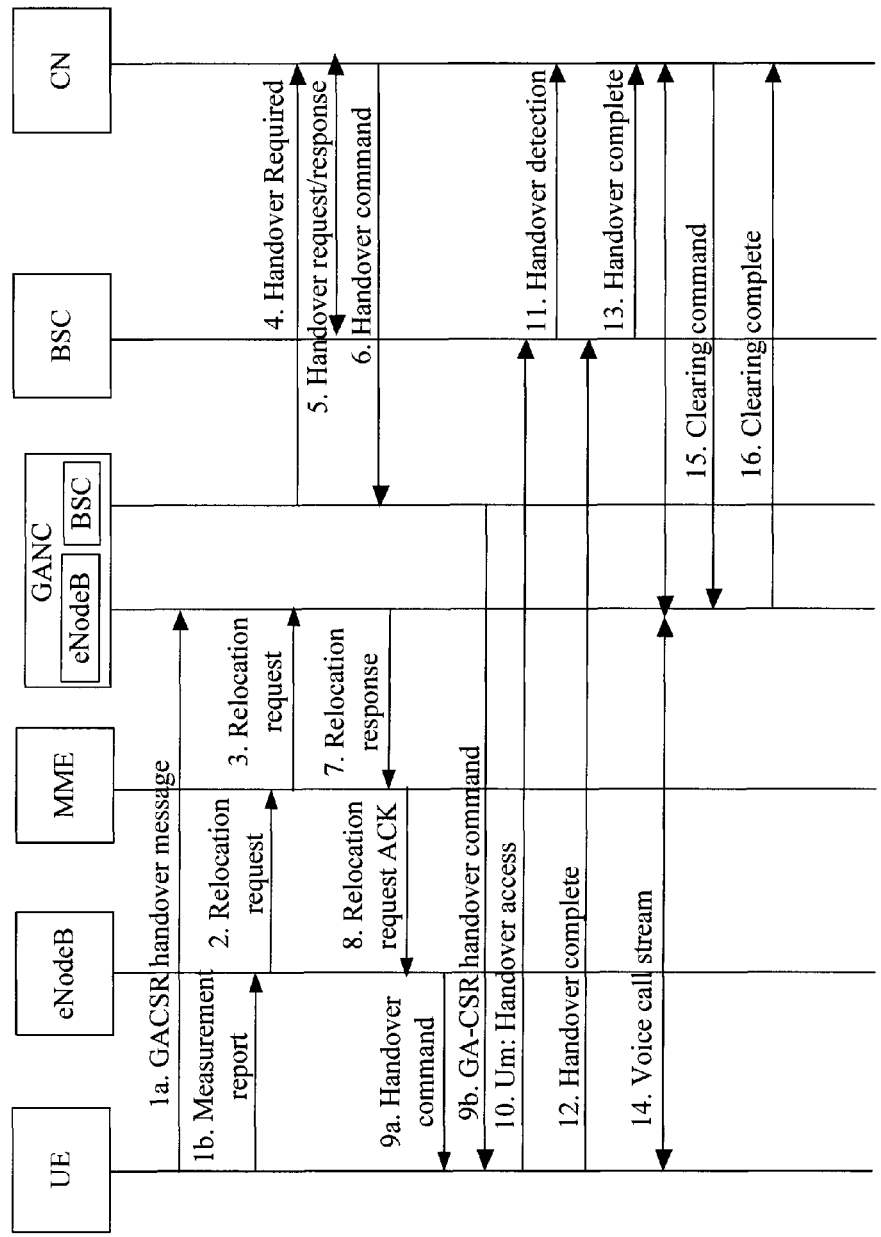
FIG. 12 shows a process of complete handover from a GAN based on SAE/LTE to a GERAN in a method embodiment of the present invention.

FIG. 12 shows a process of complete handover from a GAN based on SAE/LTE to a GERAN in a method embodiment of the present invention. This process is also applicable to the case where the target network is a UTRAN and other specific networks and the case where the UE is handed over from the GAN based on WiMAX to the GERAN or the UTRAN and other specific networks.

In this embodiment, it is supposed that a GANC is separate from an MSC in a CN. The handover process is also applicable to the case where the GANC and the MSC are located in a same physical entity. The process includes the following content.
1: A UE sends a measurement report to the GANC and an eNodeB. The GANC may prepare related CS resources to speed up the handover and reduce the handover duration. The following two ways may be available.
   a. The UE sends a Neighbor Cell List (NCL) and signal to the GANC via a GA-CSR handover message, and the GANC determines whether to hand over the UE to the GERAN according to the Neighbor Cell List. If the GANC determines to hand over the UE to the GERAN, the GANC triggers an inter-BSC handover immediately and reserves resources of the target GERAN; that is, the GANC triggers step 4 to step 6 earlier.
   b. The UE sends a measurement report to the eNodeB. The eNodeB determines whether to hand over the UE to the GERAN according to the measurement report.
2: If the eNodeB determines to hand over the UE to the GERAN according to the measurement report, the eNodeB generates a standard PS-PS handover request, and sends a handover required message to the MME.
3: From the perspective of the SAE/LTE network, a GERAN cell is used as a pseudo LTE cell. A serving MME of the UE configures related information to send a standard PS-PS message (for example, an inter-eNodeB handover message) generated by the MME to a GANC-eNodeB; or the MME sends a handover command to the GANC via a S1-CS interface, instructing the GANC to trigger the inter-BSC (or inter-MSC) handover.
4: A GANC-BSC generates a standard CS-CS handover request, and sends the handover request to the MSC in the CN, to trigger a standard CS-CS handover.
5: The CN sends the handover request to a target BSC. The target BSC reserves related resources, and then sends a handover request ACK to the CN.
6: The CN sends a handover command to a source BSC.
7: The GANC-eNodeB sends a relocation response to the MME, the relocation response includes CS resources allocated by the target BSC, or the GANC-eNodeB forwards a handover command to the MME via the S1-CS interface. This step may be triggered by step 3 or directly by step 1a.
8: The MME sends a relocation request ACK to the source eNodeB.
9: The network may send a handover command to the UE via the GANC and the SAE/LTE network, which speeds up the handover and reduces the handover duration.
   This involves two cases:
   a. The source eNodeB instructs the UE to perform handover to a target cell via a handover command, which includes radio resources of the target cell. After receiving the handover command, the UE may trigger the release of GAN related registration information.
   b. The GANC instructs the UE to perform handover to a target cell via a GA-CSR handover command, which includes radio resources of the target cell. After receiving the GA-CSR handover command, the UE may trigger the release of GAN related registration information.
10-11: The UE accesses the target cell. This process is the same as that in the prior art.
12-14: The UE finishes accessing the target cell. This process is the same as that in the prior art.
15: The CN sends a clearing command to instruct the GANC to release resources. After receiving the command, the GANC may trigger the following operations:
   a. Trigger a process of releasing voice bearers via the Rx interface. If the GANC has functions of the eNodeB or the BS, the GANC may also trigger the release of other resources.
   b. Trigger the setting of voice bearers to be inactive via the Rx interface so that the UE is not handed over from the GERAN to the GANC, for example, from the GERAN to the WiMAX network or the SAE/LTE network.
16: The GANC sends a clearing complete message indicating that related resources are already released to the CN.

An embodiment of the present invention also provides a method for handover from a GERAN to a GAN. The following describes this method supposing a GANC and an MSC are located in a same physical entity.

Figure 13:
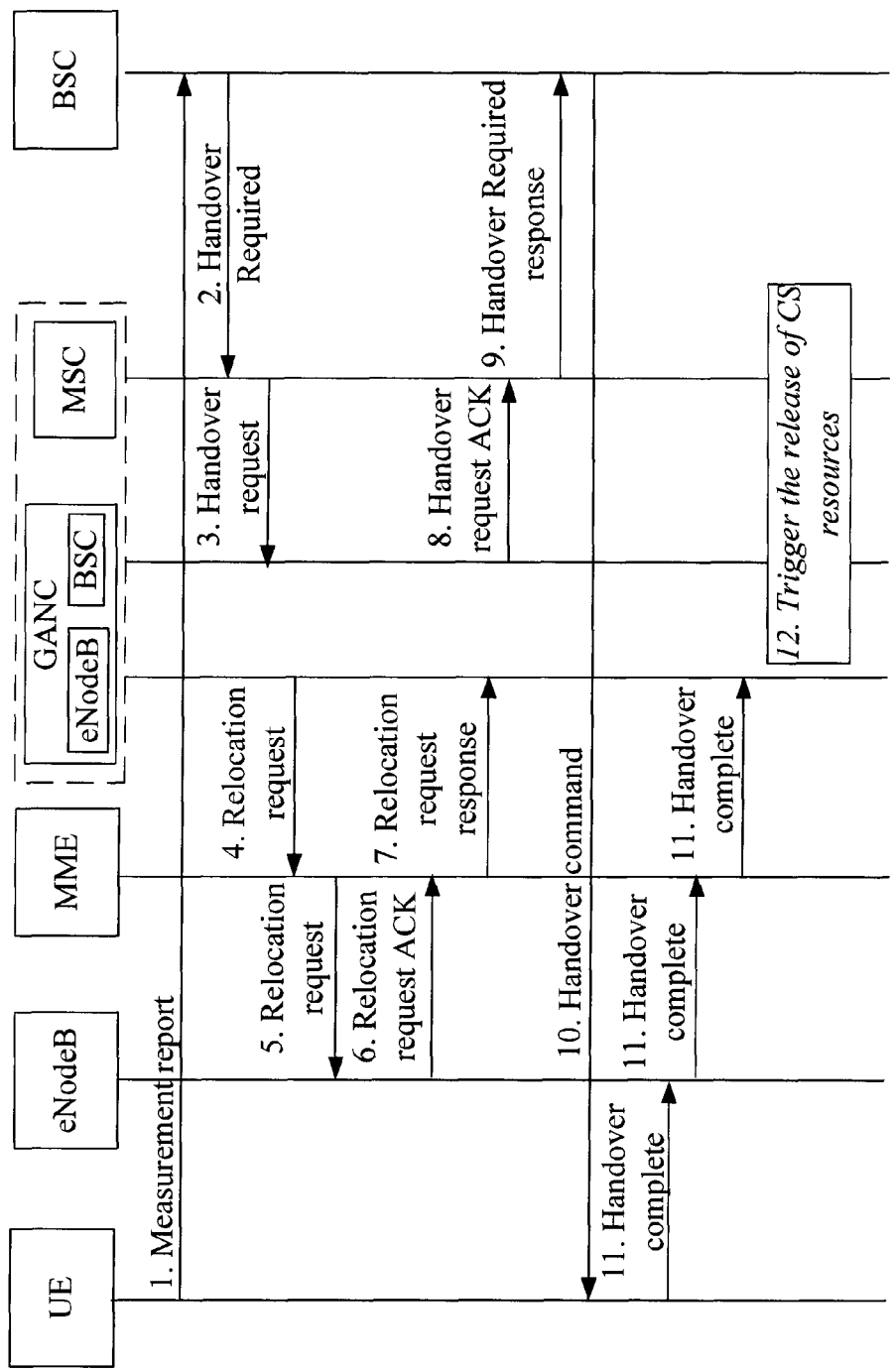
FIG. 13 shows a process of handover from a GERAN to an SAE/LTE network in a method embodiment of the present invention.

FIG. 13 shows a process of handover from the GERAN to an SAE/LTE network in a method embodiment of the present invention. This handover process is also applicable to the case where the source network is an UTRAN and the target network is a WiMAX network and other specific networks.

When the SAE/LTE network hands over a UE to the GERAN, the GANC stores the handover message sent from the SAE/LTE network.

In addition, a neighbor LTE cell is configured in a RNS/BSS, and the RNS/BSS notifies the UE of an LTE cell list. When the UE sends a measurement report to the RNS/BSS, the RNS/BSS determines whether to perform handover. If the RNS/BSS determines to hand over the UE to an LTE cell, the RNS/BSS generates a standard CS-CS handover request that includes an LTE cell ID. The CS-CS handover request is forwarded to an MSC (the MSC is registered in the GAN and located in a same physical entity as a BSC.) When the handover from the LTE network to the GERAN is triggered, a GANC-eNodeB stores user related information in the LTE network. That is, from the perspective of a CS domain, all the neighbor LTE cells are CS cells served by a GANC-BSC.

The process includes the following content.
1: The UE sends a measurement report to the BSC. The BSC determines whether to hand over the UE to the LTE network according to the measurement report.
2: From the perspective of the SAE/LTE network, the LTE cell is regarded as a pseudo CS cell. Thus, if the BSC determines to hand over the UE to the LTE network according to the measurement report, the BSC generates a standard CS-CS handover request (the target cell is an LTE cell), and sends a handover required message to the MSC.
3: The MSC sends a handover request to a GANC-BSC, or the GANC sends a handover request to an MME via a S1-CS interface, instructing the GANC to trigger an inter-eNodeB handover.
4: After receiving the handover message from the CS domain, the GANC-eNodeB retrieves the target LTE cell information (for example, the target LTE cell ID) from the handover message, and generates a PS-PS handover message according to all the handover messages stored (during the handover from the LTE network to the CS domain) to simulate an inter-eNodeB handover and restore the dedicated voice bearer in the LTE network.
5-7: The MME triggers the target network to reserve network resources and radio resources. The MME forwards a relocation request response to the GANC via a S1-MME interface or forwards a handover command to the MME via the S1-CS interface.
8: The GANC-BSC sends a handover request ACK to the MSC.

9: The MSC sends a handover required response to the BSC.
10: The BSC sends a handover command to the UE, where the handover command includes LTE radio resource information.
11-12: The UE accesses a target cell, and triggers the release of CS related resources.

Figure 14:
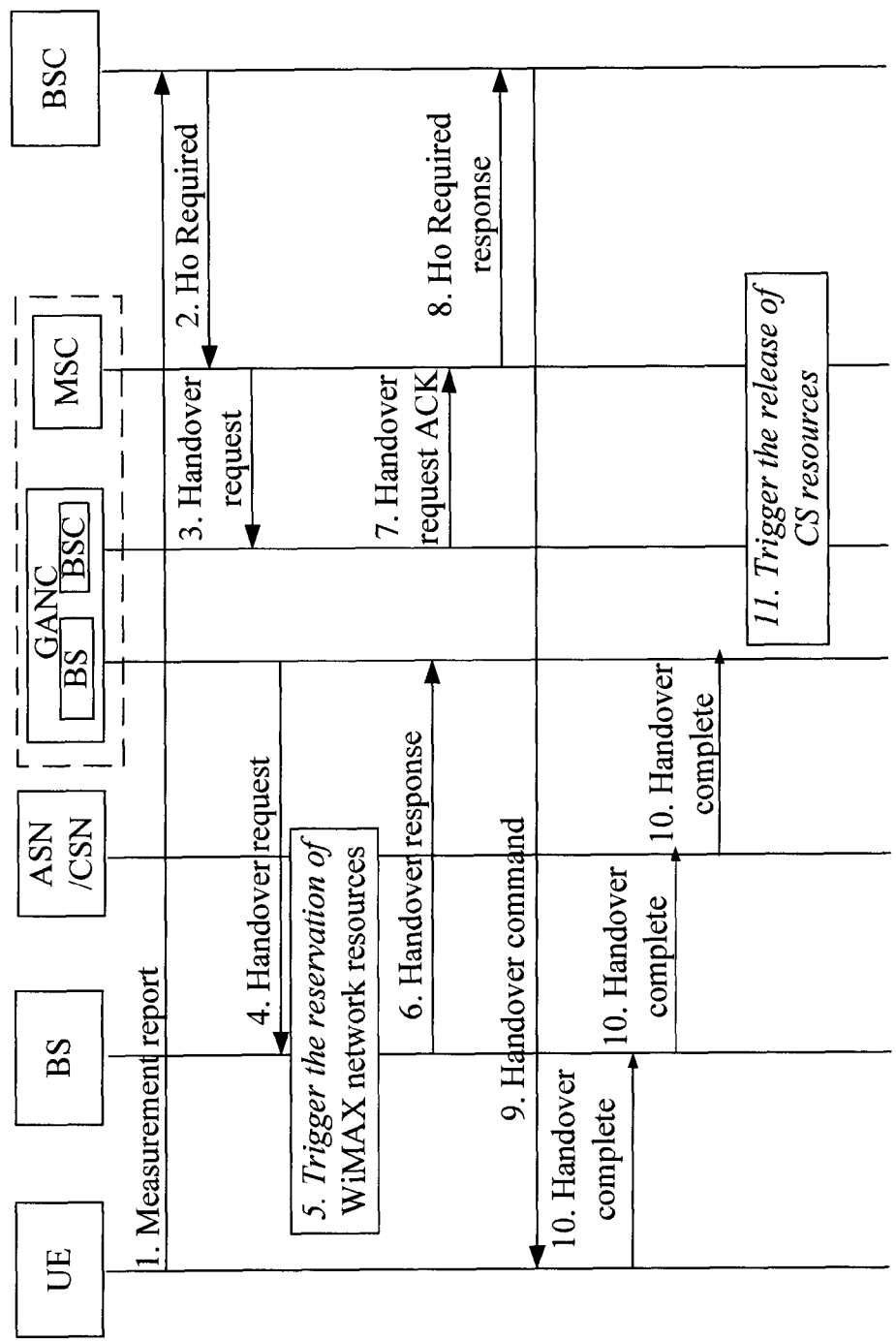
FIG. 14 shows a process of handover from a GERAN to a WiMAX network in a method embodiment of the present invention.

FIG. 14 shows a process of handover from a GERAN to a WiMAX network in a method embodiment of the present invention. This handover process is also applicable to the case where the source network is a UTRAN and a target network is an SAE/LTE network and other specific networks.

When the WiMAX network hands over the UE to the GERAN, a GANC stores the handover message sent from the WiMAX network.

In addition, a neighbor WiMAX cell is configured in a RNS/BSS, and the RNS/BSS notifies the UE of a WiMAX cell list. When the UE sends a measurement report to the RNS/BSS, the RNS/BSS determines whether to perform handover. If the RNS/BSS determines to hand over the UE to a WiMAX cell, the RNS/BSS generates a standard CS-CS handover request that includes a WiMAX cell ID. The CS-CS handover request is forwarded to an MSC (the MSC is registered in the GAN and located in a same physical entity as a BSC.) When the handover from the WiMAX network to the GERAN is triggered, a GANC-eNodeB stores user related information in the WiMAX network. That is, from the perspective of the CS domain, all neighbor WiMAX cells are CS cells served by a GANC-BSC.

1: A UE sends a measurement report to the BSC. The BSC determines whether to hand over the UE to the WiMAX network according to the measurement report.
2: From the perspective of the SAE/LTE, the WiMAX cell is regarded as a pseudo CS cell. Thus, if the BSC determines to hand over the UE to the LTE network according to the measurement report, the BSC generates a standard CS-CS handover request (the target cell is a WiMAX cell), and sends a Ho Required message to the MSC.
3: The MSC sends a handover request to the GANC-BSC.
4: After receiving a handover message from a CS domain, the GANC-BSC retrieves target WiMAX cell information (for example, the WiMAX cell ID) from the handover message, and generates a WiMAX handover message according to all the handover messages stored (during the handover from the WiMAX network to the CS domain) to simulate an inter-BS handover and restore the dedicated voice bearer in the WiMAX network.
5-6: The BS triggers the WiMAX network to reserve network resources and radio resources.
7: The GANC-BSC sends a handover request ACK to the MSC.
8: The MSC sends a handover require response to the BSC.
9: The BSC sends a handover command to the UE, where the handover command includes WiMAX radio resource information.
10-11: The UE accesses a target cell, and triggers the release of CS related resources.

Figure 15:
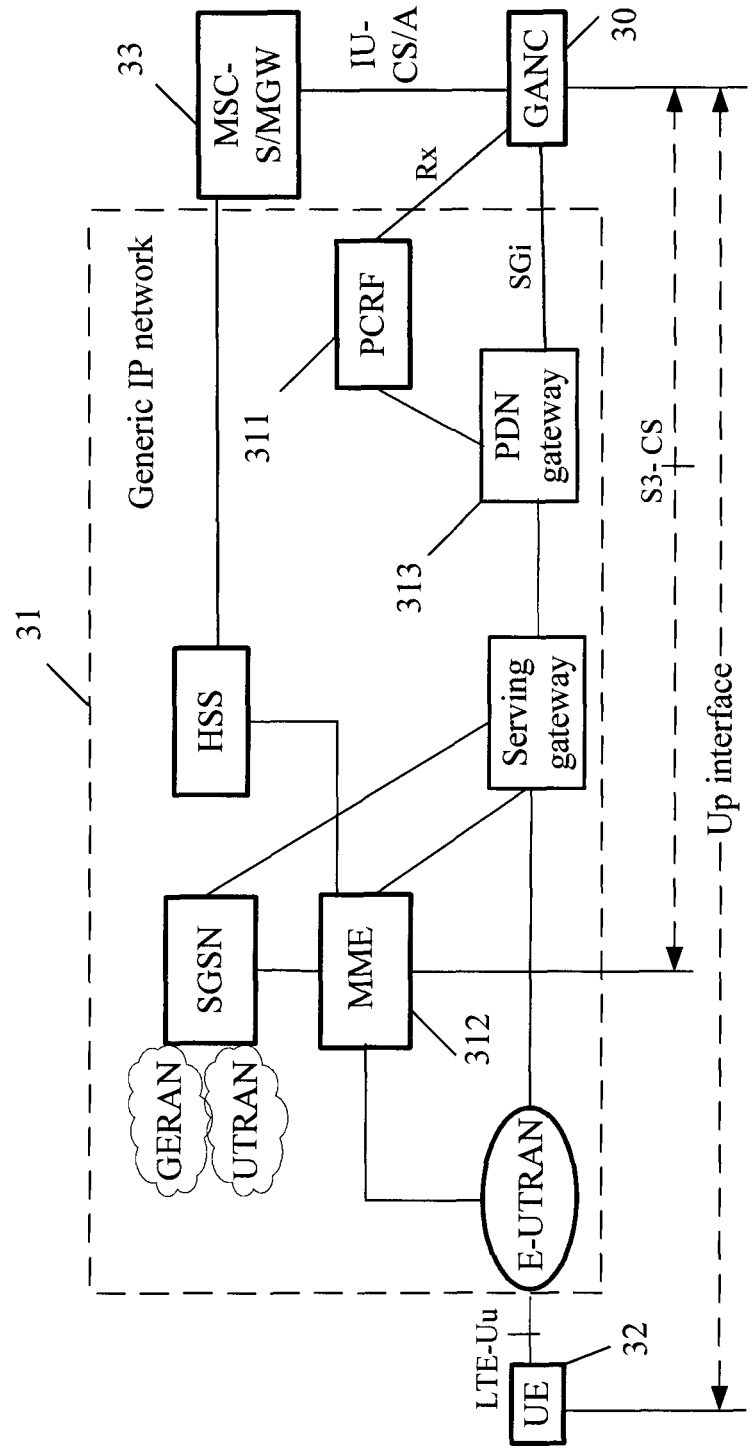
FIG. 15 shows a third architecture of a GAN based on SAE/LTE in an embodiment of the present invention.

FIG. 15 shows a third architecture of a GAN based on SAE/LTE in an embodiment of the present invention.

The network architecture shown in FIG. 15 is basically the same as that shown in FIG. 4 except for the following differences: a new interface, for example S3-CS interface, is introduced between an MME 312 and a GANC 30 to transmit signaling messages; that is, a UE 32 sends a signaling message of the GAN via an NAS message to an MME 312; the MME 312 forwards the signaling message of a GAN to the GANC 30 via the S3-CS interface. From the perspective of the SAE/LTE network, the functional entity of the GANC is the SGSN or the MME. In case of handover from the SAE/LTE network to the 2G/3G network, the basic process is similar to those described in FIG. 9, FIG. 10, FIG. 12 and FIG. 13 except that the GANC executes the functions of the SGSN or the MME. In addition, if the UE has voice call services and other data services in the SAE/LTE network, the SGSN finds the voice call service from the PS-PS handover request, and deletes the voice call service related data from the received PS-PS handover request to generate a new PS-PS handover request. In addition, the GANC generates a CS-CS handover request. When the GANC generates a PS-PS handover request and a CS-CS handover request, it adds an instruction to these messages each to notify the target network that the handover includes PS-PS handover and CS-CS handover. The handover is similar to a dual transfer mode (DTM) handover. At this time, the SGSN synchronizes with the PS-PS handover and the CS-CS handover responses.

Figure 16:
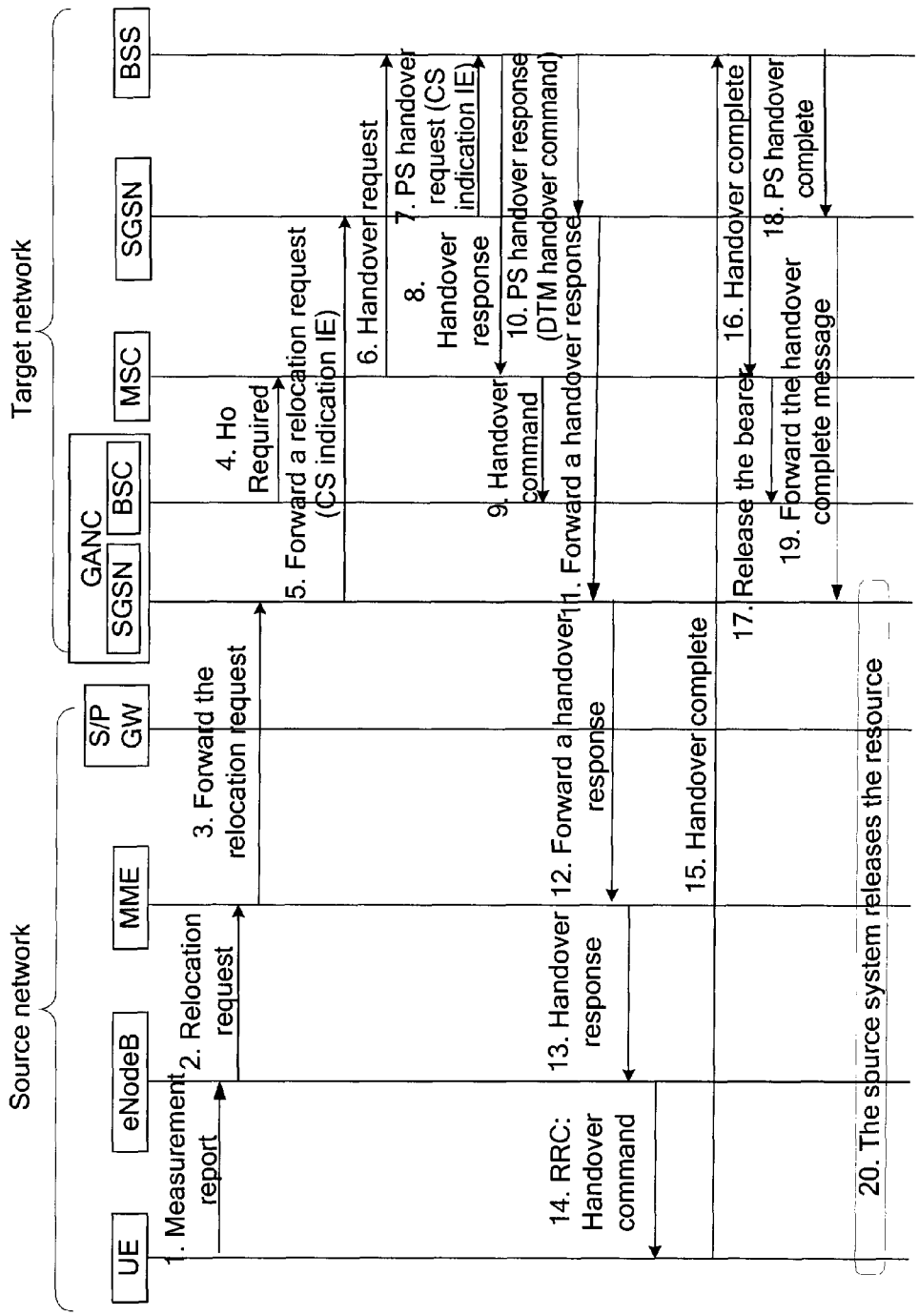
FIG. 16 shows a process of DTM handover from a GAN based on SAE/LTE to a GERAN in double transmission mode in a method embodiment of the present invention.

FIG. 16 shows a process of DTM handover from a GAN based on SAE/LTE to a GERAN. The process includes the following content.

1-2: A UE sends a measurement report, and an eNodeB determines to hand over the UE to a 2G network.
3: An MME forwards a relocation request to a GANC according to the configuration information.
4-7: The GANC generates a CS-CS handover message that carries an indication indicating that the 2G system has a concurrent PS-PS handover. In addition, the GANC generates a PS-PS handover message that carries an indication indicating that the 2G system has a concurrent CS-CS handover.
8-12: The target network reserves target network resources according to the received handover request, and returns a PS-PS handover response and a CS-CS handover response to the GANC. The GANC combines and sends these responses to the UE.
13-14: The MME and the eNodeB forward a handover command to the UE.
15-19: The UE accesses the target network according to the received handover command.
20: The network releases the source network resources.

The foregoing process is based on the fact that a functional entity of a GANC is an SGSN. If the functional entity of the GANC is an eNodeB shown in FIG. 4, a source MME or a source eNodeB is responsible for generating a PS-PS handover request and a CS-CS handover request. Other processes are similar to FIG. 16.

Figure 17:
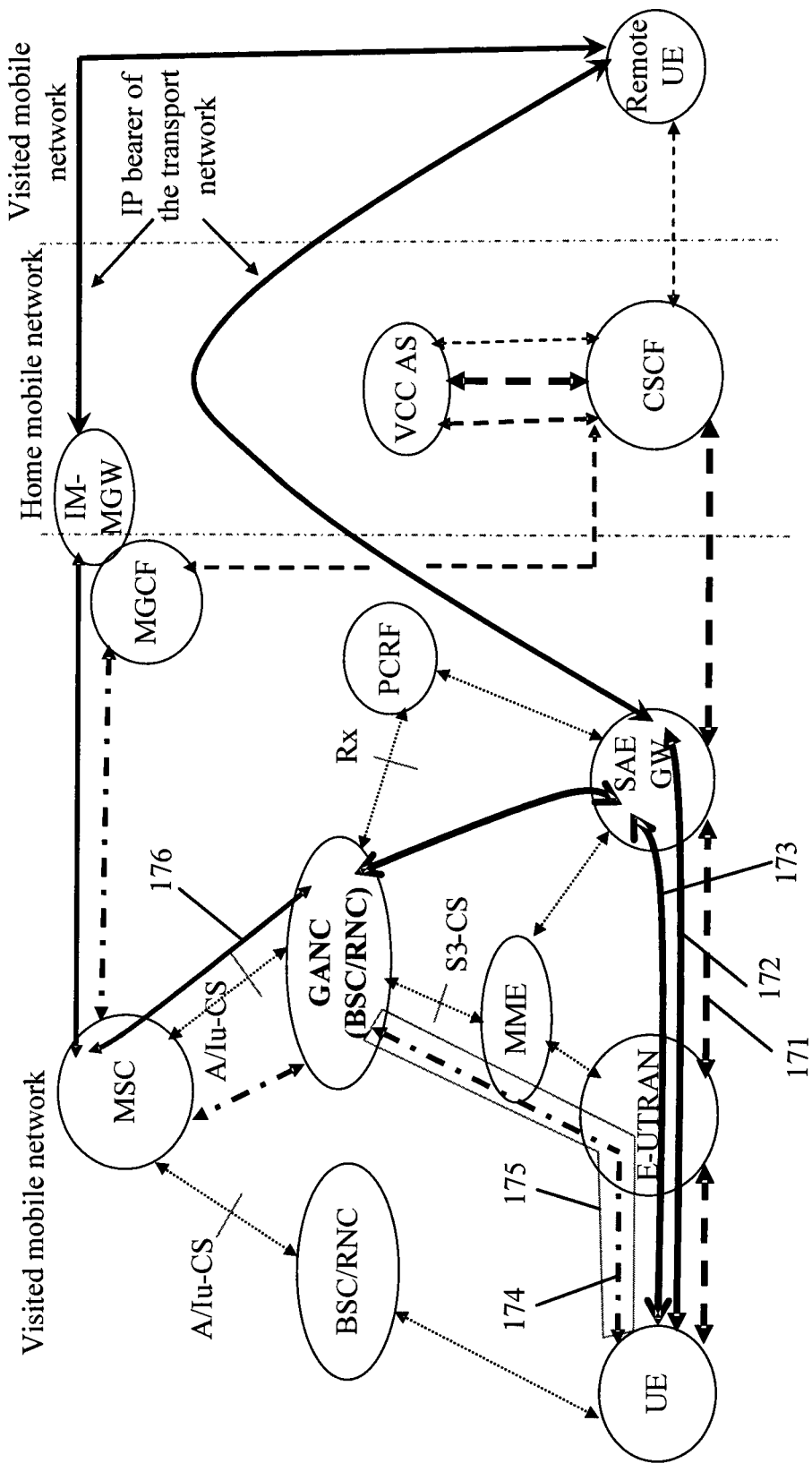
FIG. 17 is a schematic diagram illustrating service continuity in a process where a UE moves from an IMS based on SAE/LTE to a CS domain in a 2G/3G network in an embodiment of the present invention.

FIG. 17 is a schematic diagram illustrating service continuity in a process where a UE moves from an IMS based on SAE/LTE to a 2G/3G CS domain in an embodiment of the present invention.

In FIG. 17, a dotted line 171 indicates an IMS session between the UE and a Voice Call Continuity Application Server (VCC AS); a solid line 172 indicates a bearer corresponding to the IMS session; a solid line 173 indicates a bearer triggered by the GANC; a dotted line 174 indicates a CS signaling message transmitted in the NAS tunnel 175; and a solid line 176 indicates a CS bearer.

The process includes the following content: the UE uses an IMS network voice call service in the SAE/LTE network; when the UE moves to the border area between the SAE/LTE network and the 2G/3G network, the UE receives ID information of the 2G/3G network (for example, NCL and frequency point information of the 2G/3G network); the UE interacts with the GANC via the NAS tunnel via a S3-CS interface to register in the 2G/3G CS network; the UE initiates a CS call via the GANC to trigger a VCC Domain Transfer (DT) process. The process of triggering the CS call and VCC DT process includes the following content.

1: The GANC interacts with the UE via the NAS tunnel, to negotiate a Session Description Protocol (SDP) parameter of the voice bearer of the SAE/LTE network.
2: The GANC triggers a dedicated voice bearer establishment process via the Rx interface according to the negotiated SDP parameter.
3: The GANC associates related CS bearers with the PS bearers.

When the UE continues moving from the SAE/LTE network to the 2G/3G network, the process shown in FIG. 9, FIG. 10 or FIG. 12 is executed.

Figure 18:
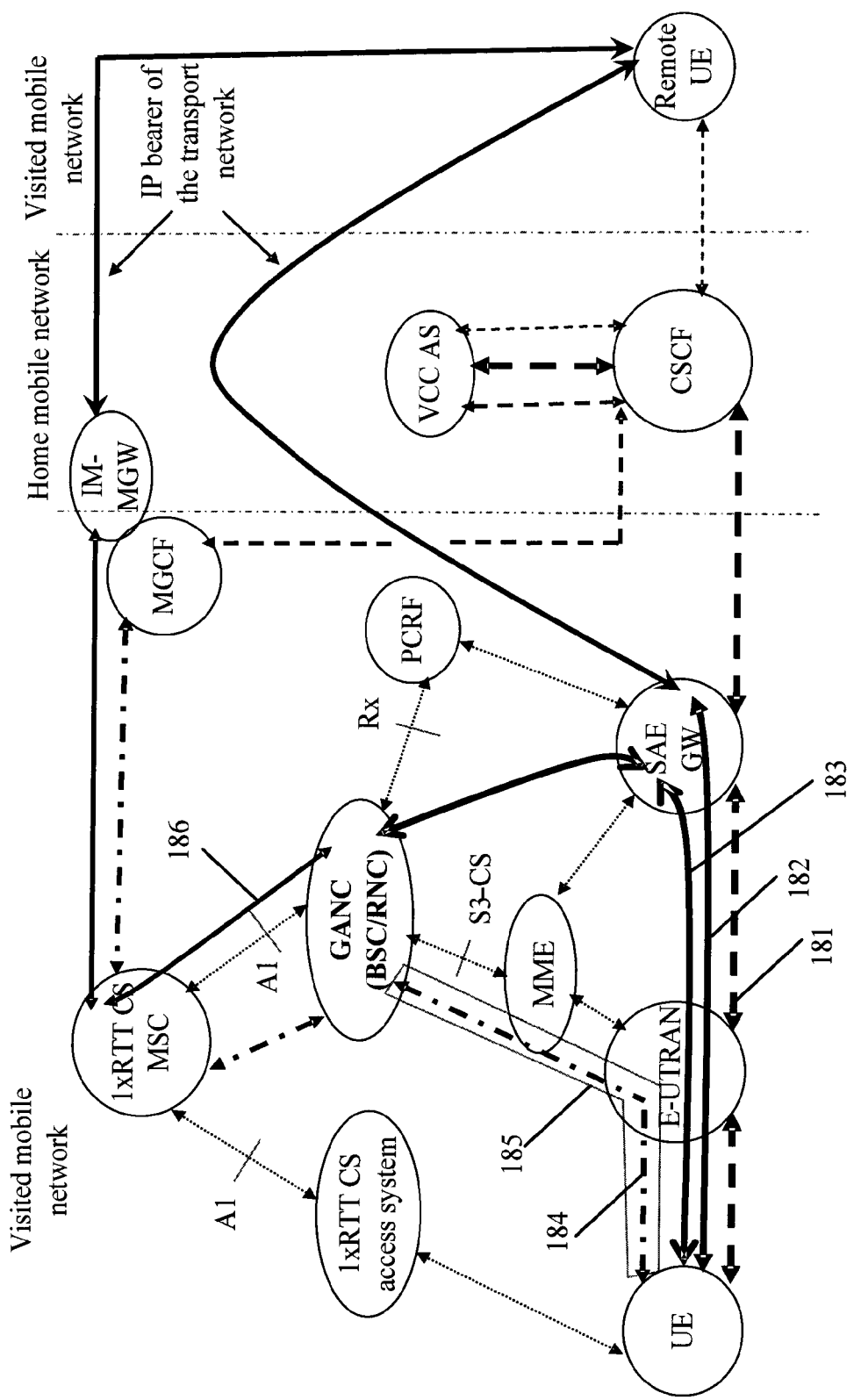
FIG. 18 is a schematic diagram illustrating voice call continuity in a process where a UE moves from an IMS based on SAE/LTE to a CS domain based on CDMA 1X in an embodiment of the present invention.

FIG. 18 is a schematic diagram illustrating service continuity in a process where a UE moves from an IMS based on SAE/LTE to a CS domain based on CDMA 1X in an embodiment of the present invention.

In FIG. 18, a dotted line 181 indicates an IMS session between the UE and the VCC AS; a solid line 182 indicates a bearer corresponding to the IMS session; a solid line 183 indicates a bearer established by the GANC; a dotted line 184 indicates a CDMA 1X CS signaling message transmitted in the NAS tunnel 185; a solid line 186 indicates a CS bearer of the CDMA 1X.

The process includes the following content: the UE uses an IMS network voice call service in the SAE/LTE network; when the LTE moves to the border area between the SAE/LTE network and the CDMA 1X CS network, the UE receives ID information of the CDMA 1X CS network (for example, NCL and frequency point information of the CDMA 1X CS network); the LTE interacts with the GANC via the NAS tunnel via a S3-CS interface to register in the 2G/3G CS network; the UE initiates a CS call via the GANC to trigger a VCC DT process.

The process of triggering the GNAC by the CDMA 1X CS call and the VCC DT process includes the following content.

1: The GANC interacts with the UE via the NAS tunnel, to negotiate the SDP parameter of the voice bearer of the SAE/LTE network.
2: The GANC triggers a dedicated voice bearer establishment process via the Rx interface according to the negotiated SDP parameter.
3: The GANC associates related CS bearers with the PS bearers.

The specific CS registration and CS calling processes may refer to FIG. 7.

When the UE continues moving from the SAE/LTE network to the 2G/3G network, the process shown in FIG. 9, FIG. 10, or FIG. 12 is executed.

Figure 19:
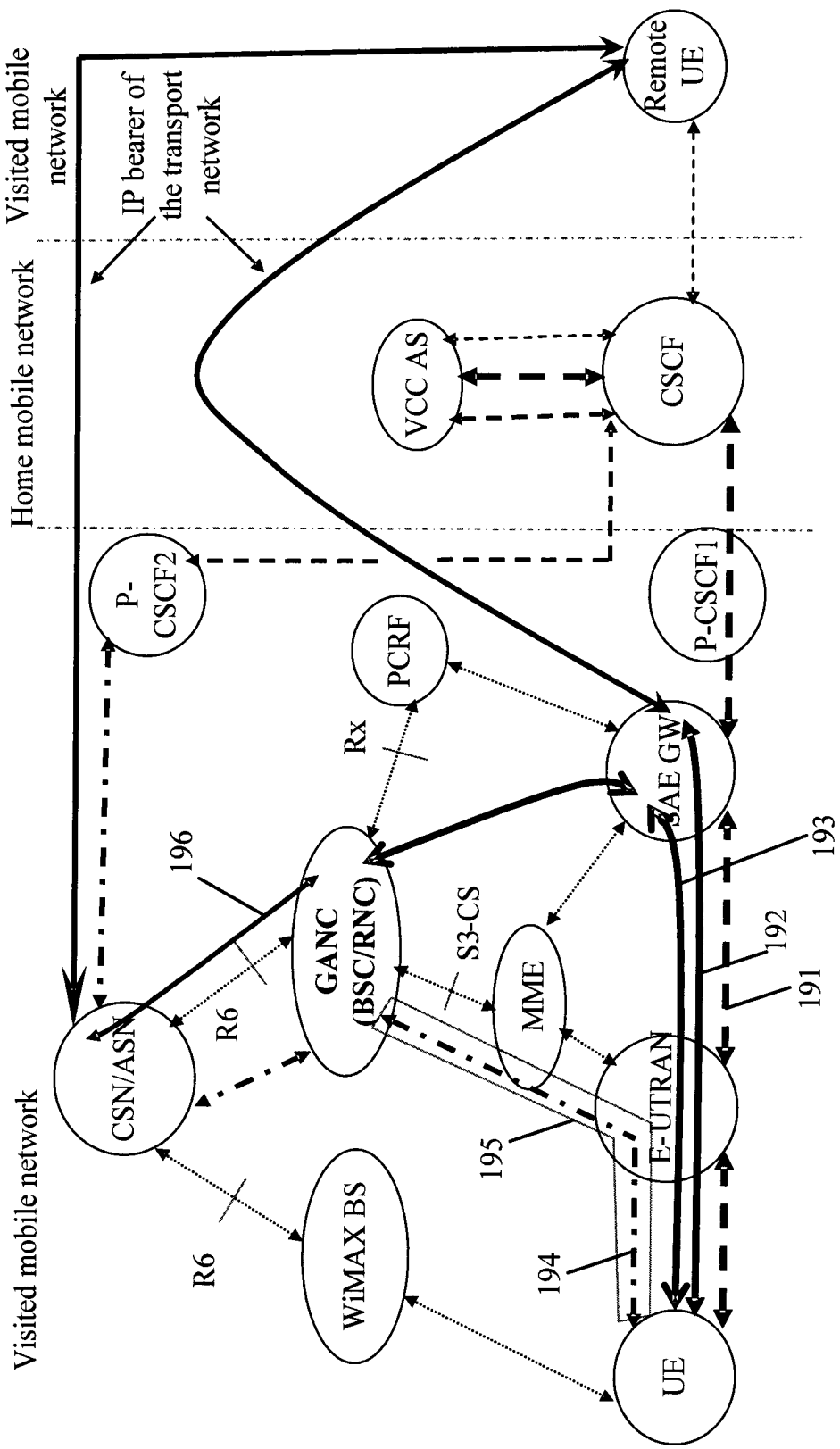
FIG. 19 is a schematic diagram illustrating service continuity in a process where a UE moves from an IMS based on SAE/LTE to an IMS based on WiMAX in an embodiment of the present invention.

FIG. 19 is a schematic diagram illustrating service continuity in a process where a UE moves from an IMS based on SAE/LTE to an IMS based on WiMAX in an embodiment of the present invention.

In FIG. 19, a dotted line 191 indicates an IMS session between the UE and the VCC AS; a solid line 192 indicates a bearer corresponding to the IMS session; a solid line 193 indicates a bearer established by the GANC; a dotted line 194 indicates a WiMAX signaling message transmitted in the NAS tunnel 195; a solid line 196 indicates a WiMAX bearer.

The process includes the following content: the UE uses the IMS network voice call service in the SAE/LTE network; when the UE moves to the border area between the SAE/LTE network and the WiMAX network, the UE receives ID information of the WiMAX network (for example, the NCL and frequency point information of the WiMAX network; the UE interacts with the GANC via the NAS tunnel via a S1-CS interface to register in the WiMAX network; the UE registers with the IMS; the UE initiates an IMS call based on the VCC. When the ASN/CSN interacts with the GANC, the GANC establishes a dedicated SAE/LTE bearer via the Rx interface. The process of triggering the GNAC by the IMS call and the VCC DT process includes the following content.

1: The GANC interacts with the UE via the NAS tunnel, to negotiate the SDP parameter of the voice bearer of the SAE/LTE network.
2: The GANC triggers a dedicated voice bearer establishment process via the Rx interface according to the negotiated SDP parameter.
3: The GANC associates related WiMAX bearers with the LTE bearers.

The specific process is similar to that in FIG. 7 and FIG. 8.

When the UE continues moving from the SAE/LTE network to the WiMAX network, the process similar to that in FIG. 9, FIG. 10 or FIG. 12 is executed.

This embodiment takes the service continuity from the LTE network to the WiMAX network as an example. Similarly, the process provided in this embodiment is also applicable to the service continuity from the WiMAX network to the LTE network.

It should be noted that all the foregoing processes are based on the network architecture 4 shown in FIG. 4. Certainly, the processes are also applicable to the network architectures shown in FIG. 2, FIG. 3 and FIG. 15.

According to the foregoing embodiments, after a GAN is introduced, a UE may access the GAN via a generic IP network; when the generic IP network is an SAE/LTE network or a WiMAX network, the UE notifies the GANC of the type of network where the UE accesses when the UE registers with the GAN. When there is a voice call service, the GANC connects to a PCC system via an Rx interface, so that the GAN can guarantee the QoS of the IP network. The handover from the GAN to a GSM CS domain is triggered by a PS-PS handover between the LTE network and the GERAN and a BS-BS handover between the WiMAX network and the BS to guarantee the voice call continuity.

The GAN provided in embodiments of the present invention supports the UE in single radio mode, which reduces power consumptions of the UE in comparison with the dual radio mode.

Detailed above are embodiments of the present invention. Although the invention is described via several exemplary embodiments, the invention is not limited to such embodiments. It is apparent that those skilled in the art can make various modifications and variations to the invention without departing from the scope of the invention. The invention shall cover the modifications and variations provided that they fall in the scope of protection defined by the following claims or their equivalents.

What is claimed is:

1. A Generic Access Network (GAN) configured to connect a generic IP network and a target network, comprising:
a Generic Access Network Controller (GANC), configured to enable a User Equipment (UE) to handover from the generic IP network to the target network, wherein the GANC comprises:
a transmission interface, configured to:
receive a handover request from a Mobility Management Entity (MME) of the generic IP network, wherein the handover request is created by a base station of the generic IP network according to a measurement report sent from the UE; and
send a relocation response to the MME according to a handover command from a Mobile Switching Center (MSC) of the target network, wherein the relocation response is delivered to the UE via the base station; and
a switch interface, configured to:
send the handover request to the MSC, wherein the MSC triggers a Circuit Switched-Circuit Switched (CS-CS) handover process in the target network according to the handover request, and generate the handover command; and
receive the generated handover command from the MSC,
wherein the target network is one of an SAE network and an LTE network, the transmission interface comprises an S1-MME interface, and the switch interface comprises an S1-U interface.

2. The GAN of claim 1, wherein the GANC further comprises:
a Packet Switched (PS) domain interface, configured to connect a PS device of the target network.

3. The GAN of claim 1, wherein the GANC further comprises:
a Circuit Switched (CS) domain interface, configured to connect a CS device of the target network.

4. The GAN of claim 1, wherein the GANC is located in the MSC of the target network.

5. The GAN of claim 1, where in the GANC further comprises:
a user interface, configured to connect the UE;
a Policy and Charging Control (PCC) interface, connected to a PCC system and configured to trigger a bear establishment process of the generic IP network.

6. The GAN of claim 5, wherein the user interface is configured to use a transmission mechanism based on an IP layer of the generic IP network.

7. The GAN of claim 5, wherein the user interface is configured to use a transmission mechanism based on a signal control message of the generic IP network.

8. The GAN of claim 7, wherein the generic IP network is one of a System Architecture Evolution (SAE) network and a Long Term Evolution (LTE) network, and the signal control message of the generic IP network is a Non Access Stratum (NAS) message.

9. The GAN of claim 8, wherein one of the SAE network and the LTE network comprises the MME of the generic IP network configured to forward the NAS message of the UE to the GANC.

10. The GAN of claim 8, wherein one of the SAE network and the LTE network comprises the MME configured to forward a message of the GANC to the UE according to the NAS message.

11. The GAN of claim 5, wherein the GANC is configured to negotiate a borne Quality of Service (QoS) parameter with the UE according to the user interface.

12. The GAN of claim 1, wherein the generic IP network is a Worldwide Interoperability for Microwave Access (WiMAX) network, and an interface between the GANC and the target network is one of an R6 interface and an R4 interface.

* * * * *